(12) United States Patent
Sheng et al.

(10) Patent No.: US 6,654,521 B2
(45) Date of Patent: Nov. 25, 2003

(54) DIFFRACTION COMPENSATION OF FBG PHASE MASKS FOR MULTI-CHANNEL SAMPLING APPLICATIONS

(75) Inventors: Yunlong Sheng, Fremont, CA (US); Joshua E. Rothenberg, Fremont, CA (US); HongPu Li, Fremont, CA (US); Ying Wang, Fremont, CA (US); Jason Zweiback, Fremont, CA (US)

(73) Assignee: Teraxion Inc., Sainte-Foy (CA)

( * ) Notice: Subject to any disclaimer, the term of this patent is extended or adjusted under 35 U.S.C. 154(b) by 0 days.

(21) Appl. No.: 10/056,575

(22) Filed: Jan. 23, 2002

(65) Prior Publication Data

US 2003/0138206 A1 Jul. 24, 2003

(51) Int. Cl.[7] .................................................. G02B 6/34
(52) U.S. Cl. ..................................................... 385/37
(58) Field of Search .......................... 385/37; 359/566; 65/425, 392; 430/290; 264/1.27

(56) References Cited

U.S. PATENT DOCUMENTS

| | | | | |
|---|---|---|---|---|
| 5,327,515 A | * | 7/1994 | Anderson et al. | ........... 359/566 |
| 5,367,588 A | * | 11/1994 | Hill et al. | .................... 385/37 |
| 5,604,829 A | * | 2/1997 | Bruesselbach | ............... 385/37 |
| 5,745,617 A | * | 4/1998 | Starodubov et al. | .......... 385/37 |
| 6,081,640 A | | 6/2000 | Ouellette et al. | |
| 6,466,714 B1 | * | 10/2002 | Kurihara et al. | .............. 385/37 |
| 6,545,808 B1 | * | 4/2003 | Ehbets et al. | ............... 359/566 |
| 6,553,163 B2 | * | 4/2003 | Tormen | ........................ 385/37 |

FOREIGN PATENT DOCUMENTS

GB 2316760 A * 3/1998 ............ G02B/6/00

OTHER PUBLICATIONS

U.S. patent application Ser. No. 09/757,386, Rothenberg et al., filed Jan. 8, 2001.
Kashyap, R., et al. "UV Written Reflection Grating Structures in Photosensitive Optical Fibers Using Phase–shifted Phase Masks," Electronics Letters, vol. 30, No. 23, pp. 1977–1978, Nov. 10, 1994.
Kashyap, R., "Fiber Grating Band–pass Filters," Chapter 6, *Fiber Bragg Gratings*, Academic Press, San Diego, pp. 227–309, 1999.
Williams, J.A.R., et al., "The Effects of Phase Steps in E–Beam Written Phase–Masks Used for Fiber Grating Fabrication by Near–Field Holography," ECOC 97, pp. 187–190, Sep. 22–25, 1997.

(List continued on next page.)

*Primary Examiner*—Michael P. Stafira
*Assistant Examiner*—Juan D. Valentin, II
(74) *Attorney, Agent, or Firm*—Fulbright & Jaworski L.L.P.

(57) ABSTRACT

The present invention is directed to a system and method for designing efficient multi-channel FBG gratings using a pre-compensated phase mask for diffracting light for side-writing the grating on an optical fiber core. A desired phase function of the FBG is generated, specifically tailored to an effective spacing between the phase mask and the optical fiber core. From the phase function a phase mask is pre-compensated to offset diffraction effects associated with each longitudinal position of the FBG receiving light from two corresponding longitudinal positions of the phase mask substantially symmetrically spaced longitudinally relative to each particular longitudinal position of the FBG. The two corresponding longitudinal positions of the phase mask are spaced longitudinally from each other by a spacing determined by the effective spacing between the phase mask and fiber core and by the first order diffraction angle of light through the phase mask.

73 Claims, 14 Drawing Sheets

OTHER PUBLICATIONS

Goodman, J.W., "Foundations of Scalar Diffraction Theory," Chapter 3, *Introduction to Fourier Optics*, McGraw Hill, New York, pp. 30–54, 1968.

Mait, J.N., "Design of Binary Phase and Multi–phase Fourier Gratings for Array Generation," Journal of the Optical Society of America A., vol. 7, pp. 1514–1528, 1990.

Ichikawa, H., "Electromagnetic Analysis of Diffraction Gratings by the Finite–Difference Time–Domain Method," Journal of the Optical Society of America A., vol. 15, No. 1, pp. 152–157, 1998.

Erdogan, T., "Fiber Grating Spectra," Journal of Lightwave Technology, vol. 15, No. 8, pp. 1277–1294, Aug. 1997.

Press, William H., et al. "Minimization or Maximization of Functions," Chapter 6, pp. 394–397, *Numerical Recipes in C*, $2^{nd}$ Ed.,. Cambridge University Press, Cambridge, England, 1992.

Liu X. et al "Design and fabrication of specific filter responses in photosensitive fiber gratings produced by UV holographic exposure"; CLEO '97, Conference on Lasers and Electo–Optics, Baltimore, MD, May 18–23, 1997; CLEO: Conference on Lasers and Electro–Optics, New York, IEEE, US May 18, 1997, pp. 390–391.

Sandel D. et al., "Chirped Fiber Bragg Gratings for Optical Dispersion Compensation: How to Improve their Fabrication Accuracy," European Conference on Optical Communication 1996, Oslo, Sep. 15, 1996 pp. 233–236.

Quellette F. et al., "Broadband and WDM Dispersion Compensation using Chirped Sampled Fibre Bragg Gratings," Electronics Letters, IEE Stevenage, GB, vol. 31, No. 11, May 25, 1995, pp. 899–901.

Ibsen M. et al., "Sinc–Sampled Fiber Bragg Grating for Identical Multiwavelength Operation," OFC'98. Optical Fiber Communication Conference and Exhibit, Technical Digest, Conference edition, San Jose CA, Feb. 22–27, 1998; OSA Technical Digest Series, vol. 2, New York, NY: IEEE, US 1998, pp. 5–6.

Lupken, H. et al., "On the Design of Dammann Gratings," Optics Communications, North–Holland Publishing Co., Amsterdam, NL, vol. 100, No. 5/6, Jul. 15, 1993, pp. 415–420.

Mait, Joseph N., "Design of binary–phase and multiphase Fourier gratings for array generation," Journal of the Optical Society of America, vol. 7, No. 8, Aug. 1990, pp. 1514–1528.

Graf, U.U. et al. "Fourier Gratings as Submillimeter Beam Splitters," IEEE Transactions on Antennas and Propagation; IEEE Inc. New York, US, vol. 49, No. 4, Apr. 2001, pp. 542–546.

Turunen J. et al., "Stripe–Geometry Two–Dimensional Dammann Gratings," Optics Communications, North–Holland Publishing Co., Amsterdam, NL, vol. 74, No. 3–4 Dec. 15, 1989, pp. 245–252.

Krackhardt, U. et al., "Design of Damann–Gratings for Array Generation," Optics Communications, North–Holland Publishing Co., Amsterdam, NL, vol. 74, No. 1–2, Dec. 1, 1989, pp. 31–36.

Rothenberg J.E. et al., "Damann Fiber Bragg Gratings and Phase–Only Sampling for High Channel Counts," IEEE Photonics Technology Letters, IEEE Inc., New York, US vol. 14, No. 9, Sep. 2002, pp. 1309–1311.

International Search Report for PCT/CA03/00087 dated May 13, 2003.

* cited by examiner

DIFFRACTION COMPENSATION OF FBG PHASE MASKS FOR MULTI-CHANNEL SAMPLING APPLICATIONS

CROSS-REFERENCE TO RELATED APPLICATIONS

The present application is related to commonly assigned U.S. patent application Ser. No. 09/757,386, entitled "Efficient Sampled Gratings for WDM Aplications," filed Jan. 8, 2001, the disclosure of which is hereby incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The complexity of Fiber Bragg Grating (FBG) structures continually increases, for example in non-linear chirped FBGs for tunable dispersion compensation, dispersion-free FBGs in the DWDM networks, multi-channel sampled FBGs, DFB fiber lasers, gain-flattening filters (GFF) in Erbium doped fiber amplifiers (EDFAs), and other FBG applications.

There are applications in which it is desired to make FBGs with multiple bands of reflectivity in the telecommunications band around 1,550 nm, for example a band of reflectivity 1 nanometer wide at 1,550 nm, and then another at 1,552 nm. These periodically extend for example throughout the C-Band from about 1,530 nm to 1,565 nm, in which the erbium doped fiber amplifier has gain. The ITU standard grid either at 100 gigahertz spacing (roughly 0.8 nm), or 50 gigahertz spacing (roughly 0.4 nanometers) is where typical telecommunication laser transmitters operate that send voice and data information over telephone systems today. A standard set of frequencies or wavelengths in this 1,535 nm to 1,565 nm band has been selected by standards committees, and it is therefore of interest to fabricate FBGs which operate at those wavelengths. In such an FBG there is an underlying grating period of about 0.5 micron with slower superimposed modulations that produce effects like chirp and non-linear chirp, which are fundamentally important to particular applications such as dispersion compensation.

The reflectivity peak of a Bragg grating occurs at a wavelength equal to twice the index of refraction of the fiber core times the physical period of the index grating. Typically, the period of the index grating is about 0.5 micron and the index of refraction is about 1.5, such that twice 1.5 times 0.5 microns results in 1.5 microns or reflectivity in the band around 1500–1550 nanometers.

One approach is to make a fiber Bragg grating that, rather than reflecting in a wide continuous wavelength band which can result in a FBG which is impractically long, reflects specifically in multiple channels located at periodically spaced frequencies (or wavelengths). Each channel reflects in a certain bandwidth around its central wavelength, and in this bandwidth the FBG can provide a number of filtering functions, such as tunable dispersion compensation. A method called sampling imposes a periodic superstructure on the underlying 0.5 micron basic Bragg grating period, producing a multiplicity of Bragg reflection peaks in the spectrum surrounding the underlying Bragg reflection wavelength. The superstructure can be understood in terms of a Fourier transform argument. The underlying grating reflects at a certain wavelength, and the imposed superstructure has a Fourier transform which represents a comb function of regularly spaced peaks, one for each channel, and having a certain envelope that determines the spectral distribution or uniformity of the reflectivities of those channels. It is sufficient to understand that the multiplicity of channels is determined by the Fourier spectrum of the periodic superstructure, which can periodically vary the underlying FBG either in phase, i.e. the locations of the index modulations, or amplitude, i.e. the magnitude of the index modulations. The period of such a superstructure can be about a millimeter to generate channels with a 100 gigahertz spacing in the telecommunications band, much longer than the fundamental 0.5 micron structure of the grating.

To write a grating of periodic index variation in the core of a fiber, one way is to propagate UV light into that core. Where the UV light exposes the core, the index of refraction increases slightly, and where it does not, it does not change at all. If the basic exposure pattern has a period of about 0.5 microns, that will create reflectivity in the telecommunications band around 1,500 nanometers.

A phase mask is widely used in manufacturing fiber Bragg gratings (FBG). The side-writing systems using phase masks in close proximity to the fiber are less critical to alignment, vibration and UV beam coherence than are imaging or holographic direct write systems that demand interferometric accuracies. Accordingly, phase masks are particularly suitable for industrial fabrication. In addition, the nanometer scale structures required by the FBG are built into the phase mask, benefiting from high accuracy lithographic mask technology.

In prior art side-writing technology a fiber is placed as close as possible to the mask, which is a slab having a periodically varying surface grooves. When UV light propagates through the mask, it splits into multiple diffraction orders. The mask is manufactured such that the zeroth diffraction order, which ordinarily goes straight through, is suppressed, for example by a standard technique of adjusting the depth of the grooves in the mask. The groove depth is chosen for a particular mask groove period, such that the zeroth order is suppressed. The FBG is formed from the interference between the plus first and minus first orders diffracted from the phase mask. About 35 per cent to 40 per cent of the incident light is diffracted by the mask into each of the plus and minus first orders. Higher diffraction orders typically do not contribute to formation of the relevant Bragg index modulation in the fiber and are thus ignored, and in some circumstances are eliminated by inserting additional optics.

The interference between the two UV beams diffracted from the mask creates an intensity modulation in the core of the fiber, which modulates the index in the photosensitive fiber core. The UV writing beam may have a wavelength of typically around 244 nanometers, although the method may be used at any wavelength at which the fiber exhibits sufficient photosensitivity. For FBGs in the 1550 nm telecommunication band, the period of the mask is selected to be about 1070 nm, which produces an angle of diffraction of the first order beams of roughly +/−13 degrees, so that the two diffracted beams propagate at 26 degrees with respect to each other. When two beams are at 26 degrees to each other, they create an intensity interference pattern with a 535 nm basic period, which then generates a Bragg reflection in the band around 1550 nm. This side writing method is the standard prior art that many FBG manufacturers use, e.g. see U.S. Pat. No. 5,367,588, issued Nov. 22, 1994.

Additionally, prior art U.S. Pat. No. 6,081,640, issued Jun. 27, 2000, describes a periodic superstructure that can be either in phase, amplitude, pitch of the grating, anything that varies periodically and is recognized to create multiple channels, but does not disclose in detail how to incorporate variation of pitch or phase. One method described in U.S. Pat. No. 6,081,640 uses amplitude sampling, in which the mask has a periodic amplitude superstructure. To create a large number of reflective channels using amplitude sampling requires a very small duty factor. That is, for example, a periodic rectangular wave amplitude superstructure pattern where the "on" section is extremely short and the "off" section is very long, generates many channels, but that periodic superstructure is "off" most of the time, such that there is no grating in most of the fiber. That is, a small section of grating is followed by a long section with no grating present, which is then is followed by another small section of grating. To achieve significant reflectivity the light must interact for a reasonably long path length with the grating. The way Bragg reflection works is that each reflection from a single period of index variation is extremely small, on the order of $10^{-3}$ reflection amplitude from each index period, and at the Bragg resonance wavelength they add constructively to generate a high reflectivity band.

Therefore, amplitude sampling is extremely inefficient, since most of the fiber has no grating present. In contrast, phase sampling, i.e., periodically varying either the pitch or equivalently the phase of the grating, creates multiple channels without turning off the grating. Consequently, light is always interacting with the periodic grating modulation along the entire length of the FBG, and it can be more efficient by approximately the square root of the number of channels in using the amplitude of the index grating in the fiber.

Phase-steps are examples of basic structures in a variety of FBGs, which introduce phase shifts in the FBG profile function. To write phase-steps in the FBG, a widely used method is to incorporate phase-steps of the same sizes and at the same locations along the fiber in the phase mask. This approach was first proposed by R. Kashyap et al., "UV written reflection grating structures in photosensitive optical fibers using phase-shifted phase masks," Electron. Lett. Vol. 30, p. 1977–1978 (1994), followed by many laboratories across the world (see for example R. Kashyap, "Fiber Bragg gratings," Chapter 6 (Academic Press, San Diego, p. 227–309 (1999)), because the preliminary experiments showed that the phase-step in the phase-shifted phase mask is substantially replicated in the FBG. However, J. A. R. Williams et al. in "The Effects of Phase Steps in E-Beam Written Phase Masks Used for Fiber Grating Fabrication by Near-Field Holography," ECOC 97, 187–190 (1997), reported experimental results, which showed disparity from those predicted by the phase-step replication model. Using the Fresnel-Kirchoff diffraction equations, they calculated the phase mask interference pattern at the fiber core, and the FBG spectrum. The numerical results showed asymmetry in the FBG spectrum, which is not predicted by the replication model.

Therefore, what is needed in the art are a system and method for writing efficient multi-channel FBG gratings using a phase mask, such that the generated FBG spectrum accurately reproduces the intended design substantially free of asymmetry.

BRIEF SUMMARY OF THE INVENTION

The present invention is directed to a system and method for designing efficient multi-channel FBG gratings using a pre-compensated phase mask for diffracting light for side-writing the grating on an optical fiber core. In accordance with embodiments of the present invention, a desired phase function of the FBG is generated, specifically tailored to an effective spacing between the phase mask and the optical fiber core. From the phase function a phase mask is pre-compensated to offset diffraction effects associated with each longitudinal position of the FBG receiving light primarily from two corresponding longitudinal positions of the phase mask that are substantially symmetrically spaced longitudinally relative to each particular longitudinal position of the FBG. The two corresponding longitudinal positions of the phase mask are spaced apart from each other with a longitudinal spacing determined by the effective spacing between the phase mask and fiber core and by the first order diffraction angle of light through the phase mask. The embodiments of the present invention generate a FBG spectrum that accurately reproduces the intended design, where the effect of the diffraction of the writing beam from the mask to the proximally located fiber is properly accounted for.

In a first embodiment, a continuous phase variation is to be imparted to the FBG. It is disclosed that the phase imparted to the FBG is substantially given by the sum of the phases of the mask corrugation at two separate locations on the mask, symmetrically spaced longitudinally relative to the position in the FBG. Based on this understanding, it is shown that the fraction effects can be accounted for by pre-compensation of the phase function on the mask. In this approach Fourier filtering of the desired FBG phase function with the inverse of the spatial frequency transfer function of diffraction effect, gives a mask function that will generate the desired FBG phase function, after including the effects of diffraction.

In further embodiment, an FBG design approach disclosed in U.S. patent application Ser. No. 09/757,386, the disclosure of which has been incorporated herein by reference, uses a concept called 'the Dammann grating.' This type of grating is a periodic sequence of discrete α phase shifts at locations, optimized so that the Fourier spectrum of the pattern is a set of equally spaced channels with a desired overall envelope (see for example J. N. Mait, "Design Of Binary Phase and Multi-Phase Fourier Gratings for Array Generation," Journal of the Optical Society of America A, Vol. 7, (1990) p. 1514–1528). Phase steps on the phase mask constitute the key structure in this approach to a multichannel sampled FBG. Numerical analysis shows that the phase steps on the phase mask are not replicated in the fiber core in the contact side-writing process, as asserted by Kashyap et al., Electron. Lett. (1994), cited above. Instead, because of free space propagation from phase mask to the fiber core, a phase step on the phase mask becomes divided into two equal phase steps in the FBG, which are separated by a distance proportional to the spacing between phase mask and fiber core. As a consequence of this phase step separation, the envelope of the multiple spectral channels, which are created by the sampling function in the FBG, will be modulated by a cosine envelope, which is shifted by $\pi/4$ in phase with respect to the central wavelength of the envelope.

The present invention disclosure demonstrates by using a rigorous Finite Difference in Time Domain (FDTD) method that a phase-step in the phase-shifted phase mask is not replicated in the fiber core, but is split into two equal phase-steps by beam diffraction, generating an asymmetric distortion of the multi-channel FBG spectrum. A theoretical model relates the experimental asymmetry in the FBG spectrum to the splitting of the phase-steps. Alternating the signs of the π/2 phase-steps in the phase mask recovers the symmetry of the FBG structure in spite of the phase-step splitting. A series of new phase mask design methods take into account the splitting of the phase-steps and eliminates the asymmetric distortion of the multi-channel FBG spectra.

Embodiments of the invention disclose a fundamental understanding of diffraction of the phase mask, which can be applied to the most widely used FBG fabrication process and to substantially all designs of phase-shift phase masks used for contact side-writing of superstructure FBGs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

The variation of phase of the grating for a multi-channel application can be designed in a variety of ways, as disclosed in U.S. patent application 09/757,386, the disclosure of which has been incorporated herein by reference. The phase can be periodically varied in a continuous fashion, sometimes referred to as varying the chirp, or in a discrete fashion, sometimes referred to as phase steps or phase shifts.

Figure 1:
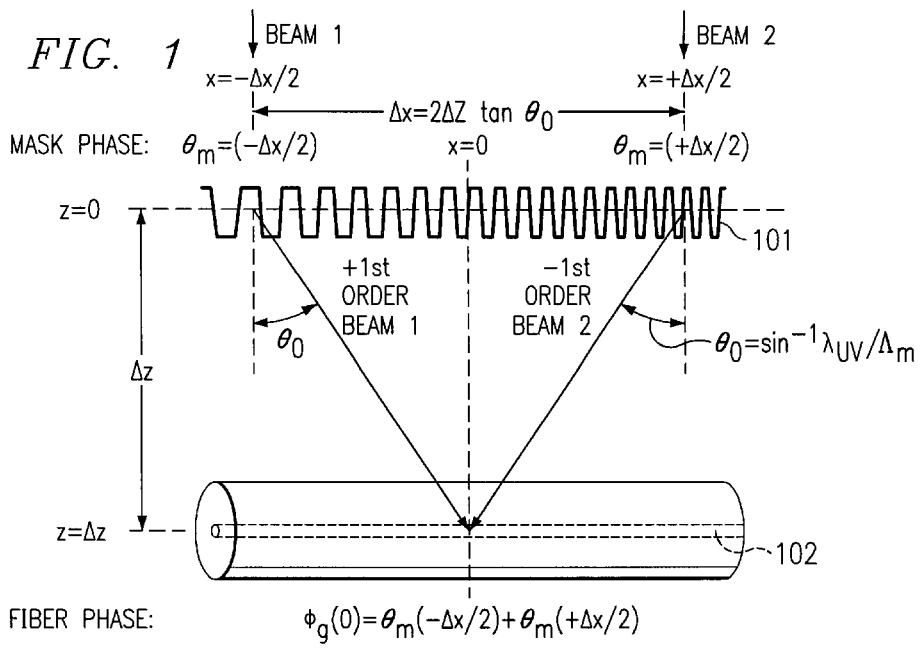
FIG. 1 is a schematic diagram illustrating the diffraction geometry of two ultraviolet beams diffracted through a mask and intersecting in a fiber core to write a fiber Bragg grating.

FIG. 1 is a schematic diagram illustrating the diffraction geometry of two ultraviolet beams diffracted through a mask and intersecting in a fiber core to write a fiber Bragg grating. Mask 101 and fiber core 102 are separated by perpendicular distance Δz. Illustratively, the phase θm, the position of the mask corrugations 101, is gradually varying, for example by a few degrees in each period, where 360 degrees or 2π radians of phase constitutes an entire period or pitch in the FBG or mask. In a sense, a discrete discontinuous phase shift in mask 101 is an extreme example of this gradual phase variation. Beam 1 intercepts mask 101 at z=0 and splits into two diffraction orders separated by an angle $2\theta_0$, where diffraction angle $\theta_0 = \sin^{-1} \lambda_{UV}/\Lambda_m$, $\lambda_{UV}$ is the ultraviolet wavelength, and $\Lambda_m$ is the period of mask 101, such that beam 1 generates a diffracted plus first order as shown. At mask plane z=0, beam 2 displaced by longitudinal distance Δx relative to beam 1 likewise splits at mask 101 into two diffraction orders separated by angle $2\theta_0$ and generates a diffracted minus first order as shown. For most masks intended for telecommunication FBG manufacture, diffraction angle $\theta_0$ is approximately 13°. Illustratively, the plus first order of beam 1 and the minus first order of beam 2 are the only beams that intersect fiber core 102 at position x=0, because the incident angle is constrained to diffraction angle $\theta_0$. Accordingly, the information that reaches fiber core 102 at x=0 comes from two different locations in mask 101, namely x=+Δx/2 and x=−Δx/2. Whatever happens at fiber core 102 at x=0 is substantially independent of what happens in mask 101 at x=0, for example, because the beam that intercepts mask 101 at x=0 splits and goes into two points in the fiber core 102 that are now separated by distance Δx substantially symmetric about x=0. According to the diffraction geometry illustrated in FIG. 1, longitudinal shift πx=2πz tan θ$_0$.

Phase φ$_g$(0) generated in fiber core 102 at x=0 by the interference pattern of intersecting diffracted beams 1 and 2 is equal to phase θ$_m$ of mask 101 at location −Δx/2 plus the phase of mask 101 at +Δx/2. Thus, half of the information comes from one location on the mask, and half comes from separate location on the mask. If distance Δz between mask 101 and fiber core 102 becomes zero, then distance Δx also goes to zero, and phase φ$_g$ of fiber 102 is exactly twice phase θ$_m$ of mask 101, because −Δx/2 and +Δx/2 are now the same point. This relationship applies rigorously only if mask 101 and fiber core 102 are in perfect contact, which is physically impossible without imaging optics, because the core is ~62 μm from the surface of a typical fiber. In the more general case, phase φ$_g$ at any particular longitudinal position x in fiber core 102 is the sum of phases θ$_m$ from two different locations in mask 101 that are symmetrically spaced longitudinally about that particular longitudinal position x in fiber core 102, in accordance with 13° (or another value as determined by the formula θ$_0$=sin[1] λ$_{UV}$/Λ$_m$) diffraction angle.

There are circumstances in which it is desired to write a FBG using a rapidly varying phase function, for example to generate multiple reflective channels (wavelengths). As a result of diffraction from mask 101, the phase information that is written into mask 101 is distorted when it is transferred to a FBG by contact side-writing ("proximity printing"). Mathematical modeling of the transfer of this phase information provides a method to compensate for the resulting distortion. A class of mask designs, in accordance with embodiments of the present invention are able, in spite of the distortion from diffraction, to generate a large number of reflective channels in a FBG, when the mask is used in a proximity printing arrangement.

Mask 101 has a periodic corrugation structure which, when illuminated by the writing beam laser as depicted by beams 1 and 2 in FIG. 1 (typically UV, but not required to be so), transmits an intensity interference fringe pattern to FBG core 102. These two beams are shown for illustration only. Typically a single extended beam of width larger than the separation between beams 1 and 2 in FIG. 1 is used for proximal side writing of FBGs, and beams 1 and 2 can be considered as two light rays of a large single extended beam. Without loss of generality, this corrugation structure is assumed sinusoidal, although typically the corrugation of mask 101 is closer to a square wave, which can be represented as a Fourier superposition of sinusoids. Although this detail impacts the diffraction efficiency into the first diffraction order, it does not affect the arguments made below relating to the phase of the mask or FBG. The height variation h(x) (with peaks of ±d) of the mask surface profile can be expressed as $$h(x)=d\ \sin(k_{m0}x+\theta_m(x)),\qquad(1)$$

where mask 101 has an underlying period Λ$_m$ and k-vector k$_{m0}$≡2π/Λ$_m$, the phase of mask corrugation function h(x) is θ$_m$(x), and x is the longitudinal position along the fiber core and the mask, as illustrated in FIG. 1. The period Λ$_m$ of mask 101 is chosen to generate a grating of period Λ$_g$ in fiber core 102, which causes a Bragg reflection band at a desired Bragg resonance wavelength λ$_B$=2n$_{eff}$Λ$_g$, where the period of the grating in fiber 102 is Λ$_g$=Λ$_m$/2, and n$_{eff}$ is the effective mode index of a single mode fiber. To calculate the diffracted interference pattern of mask 102 in the FBG, the transmittance T(x) of mask 102 is written as $$T(x)=\exp[ik_{UV0}(n_{mask}-1)h(x)]=\exp[i\phi_0\ \sin(k_{m0}x+\theta_m(x))],\qquad(2)$$

where k$_{UV0}$=2π/λ$_{UV}$ is the illuminating ultraviolet (writing beam) k-vector, the differential phase transmittance T(x) of the mask corrugation is given by θ$_0$=k$_{UV0}$(n$_{mask}$−1)d, and n$_{mask}$ is the mask index of refraction at the UV incident wavelength. A plane wave writing beam normally incident on mask 101 has a field E$_{inc}$(x,z) represented as $$E_{inc}(x,z)=\exp[ik_{UV0}z].\qquad(3)$$

Therefore the transmitted writing beam at z=0 (where z is in the direction normal to mask 101) has the dependence longitudinally along the fiber axis.

$$E_{out}(x,z=0)=\exp[i\theta_0\ \sin(k_{m0}x+\theta_m(x))].\qquad(4)$$

Applying the identity $$\exp[ia\ \sin(\theta)]=\Sigma_n^\infty J_n(a)\exp[in\theta],\qquad(5)$$

where J$_n$(a) represents an nth-order Bessel function, with a=φ$_0$ and θ=k$_{m0}$x+θ$_m$(x) results in $$E_{out}(x,z=0)=\Sigma_n^\infty J_n(\phi_0)\exp[in(k_{m0}x+\theta_m(x))].\qquad(7)$$

Therefore, considering only the first order diffracted beams (n=±1), $$E_{out}(x,z=0)=J_1(\phi_0)(\exp[i(k_{m0}x+\theta_m(x))]-\exp[-i(k_{m0}x+\theta_m(x))]).\qquad(8)$$

Making a slowly varying phase approximation, e.g., dθ$_m$/dx<<k$_{m0}$, then each term in Equation (8) is expressed as an approximate plane wave beam originating from a given longitudinal location x on mask 101. Importantly, each of these beams carries the mask phase information θ$_m$(x) (each beam is the conjugate of the other). The z-component of the k-vector of each of these beams is obtained from the requirement that k$_{UV0}^2$=k$_x^2$+k$_z^2$, and hence for both k$_{x=±km0}$ beams $$k_z=\sqrt{k_{UV0}^2-k_{m0}^2}.\qquad(9)$$

Equation (9) then defines the angle of these diffracted beams relative to the normal of mask 101, $$\sin\ \theta_0=±k_{m0}/k_{UV0}=±\lambda_{UV0}/\Lambda_m.\qquad(10)$$

For a typical FBG used in the C-Band of EDFA's, λ$_B$~1550 nm, which for n$_{eff}$=1.45 means that Λ$_m$~1.07 μm, and thus θ$_0$~13.2°. Over the entire C-Band, this diffraction angle changes by only a very small amount, for example Bragg reflections at 1530 and 1565 nm correspond to θ$_0$=13.06 and 13.37°, respectively, covering an angular span of only 5.3 mrad. This small potential spread in diffraction angle is ignored in the following analysis, but could be included to first order by noting that for a well behaved continuous mask phase function θ$_m$(x), one having ordinary skill in the art can define a locally varying effective k-vector of mask 101

$$k_{eff}(x)=k_{m0}+d\theta_m/dx\qquad(11)$$

and then can define a locally varying diffraction angle θ$_0$(x) defined by Equation (10).

Using the transmitted field, the intensity pattern in the FBG core is calculated. The index grating in the FBG will then substantially replicate this intensity pattern. The variation of the index inside the fiber core can be written as $$n(x)=n_{eff}+n_g(x)\cos(k_{go}x+\phi_g(x))=n_{eff}+Re\{n_g(x)\exp[i(k_{go}x+\phi_g(x))]\}. \quad (12)$$

In a first example, core 102 of the FBG is assumed effectively at the mask surface (z=0, e.g., by imaging). In this case, considering only the ±1 diffracted orders, the intensity at the FBG calculated directly from Equation (8) is $$1_{FBG}(x)=|E_{out}(x)|^2\alpha|\exp[i(k_{m0}x+\theta_m(x))]-\exp[-i(k_{m0}x+\theta_m(x))]|^2= \sin^2(k_{m0}x+\theta_m(x))=1-\cos(2k_{m0}x+2\theta_m(x)). \quad (13)$$

Comparing Equations (12) and (13), one skilled in the art recognizes in this case that all the phase information of mask 101 is precisely doubled (as well as the k-vector of the underlying grating, thus the underlying FBG period is exactly half of the mask period $\Lambda_g=\Lambda_m/2$), and therefore mask 101 can be designed with exactly half the phase $\phi_g$ desired for the FBG.

The situation in which fiber core 102 is displaced from the mask surface by some perpendicular distance $\Delta z$ considers the interference which forms the intensity pattern at fiber core 102 at longitudinal position x=0. Because the beams which interfere at position x=0 in the plane $\Delta z$ propagate substantially at an angle $\theta_0$ away from normal incidence, they do not originate at x=0, but rather come from longitudinally displaced positions x=±$\Delta x/2$, where $\Delta x$ has been defined above in connection with FIG. 1 in terms of diffraction angle $\theta_0$ as $$\Delta x=2\Delta z\,tan\theta_0. \quad (14)$$

For an assumed diffraction angle of 13.2°, $\Delta x=0.47\Delta z$. Since the diffracted beams must travel through the fiber cladding (~62.5 μm in radius), and refraction reduces the angle inside the fiber cladding to ~9.1°, the longitudinal shift during propagation through the cladding is ~0.32×62.5=20 μm. Hence the total longitudinal shift $\Delta x$ is given by this value plus the amount calculated using Equation (14) for the free space propagation between mask 101 and the cladding of fiber 102. For simplicity of notation, it is assumed here that the propagation to the core is through free space only. Thus, one skilled in the art can write the intensity in FBG plane $\Delta z$ using Equation (8), taking into account the shift of the beams per Equation (14). That is, the phase information of each beam comes from the mask phase longitudinally shifted by ±$\Delta x/2$, and the field is therefore given by $$E_{out}(x,\Delta z)\propto\exp[ik_z\Delta z]\times(\exp[i(k_{m0}x+\theta_m(x-\Delta x/2))]-\exp[i(k_{m0}x+\theta_m(x+\Delta x/2))]). \quad (15)$$

Conceptually, Equation (15) is consistent with mask illumination by two small collimated beams 1 and 2 separated longitudinally by $\Delta x$. These beams diffract at angles ±$\theta_0$, and the plus first order of beam 1 intersects the minus first order of beam 2 in the fiber core to form the grating. Therefore the phase of the grating in the fiber will result from mask phases $\theta_m$ at the locations separated by $\Delta x$ where the beams originate, as shown above in FIG. 1.

To summarize the above analysis thus far, Equation (1) describes the mask profile as a sinusoid rather than a square wave because it is simpler to address mathematically and because any profile can be represented as a Fourier superposition of sinusoids. Essentially phase is equivalent to a positional shift along the coordinate x parallel to the plane of the mask. In Equation (2), transmittance through the mask is essentially a periodic function, and it has a coefficient, h(x) which is essentially the depth of the mask. Z refers to the perpendicular coordinate between the mask and the fiber core. X is the longitudinal coordinate along the fiber or along the mask. $\theta_m$ is the phase of the mask, which determines where these periodic corrugations are as expressed in Equation (1). Through Equation (13), when there is no diffraction from the mask to the fiber core, a key result is that the phase at any longitudinal position x in the fiber is exactly twice the phase in the mask at the same longitudinal position. Equation (15) then expresses the field of the light transmitted through the mask in terms of $\theta_m$ evaluated at x−$\Delta x/2$ and x+$\Delta x/2$, mathematically establishing that the phase originates from these two different symmetric positions. Equations (16) through (18) below describe the intensity interference pattern at position x in the fiber core, for a particular effective fiber core to mask separation $\Delta z$, in terms of the mask phase $\theta_m$ evaluated at x±$\Delta x/2$.

To calculate intensity from Equation (15), it is useful to define the average and the difference of mask phase quantities $$\theta_{m-av}(x)=[\theta_m(x-\Delta x/2)+\theta_m(x+\Delta x/2)]/2, \text{ and} \quad (16)$$

$$\theta_{m-dif}(x)=[\theta_m(x-\Delta x/2)+\theta_m(x+\Delta x/2)]/2, \quad (17)$$

Substituting Equations (16) and (17) into (15), the intensity I (x,$\Delta z$) in the FBG plane z=$\Delta z$ is given by $$I_{FBG}(x,\Delta z)\propto|\exp[i(k_z\Delta z+\theta_{m-dif}(x))]|^2\times|\exp[i(k_{m0}x+\theta_{m-av}(x))]-\exp[-i(k_{m0}x+\theta_{m-av}(x))]|^2\propto 1-\cos(2k_{m0}x+2\theta_{m-av}(x)). \quad (18)$$

Comparing Equations (18) and (12) shows that the phase of this intensity distribution, and hence of the index grating in the core of fiber 102, is given by $$\phi_g(x)=2\theta_{m-av}(x)=\theta_m(x-\Delta x/2)+\theta_m(x+\Delta x/2). \quad (19)$$

Equation (19) shows that phase $\phi_g$ in fiber 102 is the sum of phases $\theta_m$ of mask 101 separated by longitudinal shift $\Delta x$, as illustrated in FIG. 1. For the case when $\Delta x$ is zero (perfect contact or imaging of the core to the mask), one skilled in the art will recognize that this result reduces to that of Equation (13), namely that $\phi_g(x)=2\theta_m(x)$. Likewise, phase $\phi_g$ of the grating in fiber 102 is just twice phase $\theta_m$ of mask 101 that has a constant phase. Importantly, phase $\phi_g$ of FBG 102 is equal to the sum of the mask phases $\theta_m$ at two points straddling the FBG position and separated by longitudinal shift $\Delta x$ associated with the ±1 orders of the mask, as illustrated in FIG. 1 and expressed mathematically in Equation (14). If a single beam 1 much smaller than $\Delta x$ is used to illuminate mask 101, then the two ± diffraction orders from beam 1 will be longitudinally separated by $\Delta x$ when they strike fiber 102, and do not react with each other; hence there is no interference and no FBG is written.

Typically, the periodic superstructure in the FBG needed to generate multichannel gratings requires a rapidly varying phase function, for example, because it contains π phase shifts in the fiber, and thus π/2 phase shifts in the mask. Equation (19) can be applied to describe a discontinuous π/2 shift in the mask at x=0. Considering a scan along the fiber with increasing position x, then for x<−$\Delta x/2$ in the fiber, the phase contributed by both beam 1 and beam 2 are from a phase=0 zone, which means the phase $\phi_g$ of the grating is zero. Next, beam 2 contributes a π/2 phase shift in the fiber at x=−$\Delta x/2$, and then at x=+$\Delta x/2$ beam 1 contributes an additional π/2 shift, bringing the total phase to π. Thus the X phase shift then appears in fiber 102 in two places split into equal parts. That is, beam 2 strikes the π/2 shift in the mask first and creates a n/2 discrete phase shift in fiber 102, but because phase $\phi_g$ in the fiber is the sum of two mask phases $\theta_m$ at $x=\pm\Delta x/2$, fiber phase $\phi_g$ then stays constant at $\pi/2$ until beam 1 reaches the $\pi/2$ shift and generates an additional shift in the fiber. Since both beam 1 and beam 2 are then on a $\pi/2$ plateau, the phase shift increases to and stays at $\pi$, until the next phase shift in the mask is encountered.

To make a periodic superstructure for a high channel count sampled FBG requires the phase to change on a very fine scale, for example ~25 microns, which is much smaller than the typical beam width (a few hundred pm) and much smaller than typical scale for masks which are made for applications to a single channel, where the scale sizes are centimeters. The fine scale size can be understood, since sampling with a period of ~1 mm will generate channels that are separated by ~100 GHz. To span the entire C-band would require ~40 such channels, and thus the scale length over which the phase must change is $1/40^{th}$ of a millimeter=25 $\mu$m.

A general formalism described below, which addresses a continuous arbitrary phase, automatically includes the case of discrete phase shifts. The basic principle illustrated in FIG. 1 or equivalently expressed mathematically in Equation (19), is that the phase $\phi_g$ in fiber 102 is the sum of phases $\theta_m$ of two mask locations $x=\pm\Delta x/2$ separated by longitudinal shift $\Delta x$, which is geometrically dependent on the angle $\theta_0$ of diffraction and effective separation $\Delta z$ between phase mask 101 and fiber 102, as expressed in Equation (14) above.

With the result of Equation (19) one can construct a method to compensate for the diffraction from the mask to the fiber core, so that a desired phase is achieved in the FBG. First, Equation (19) can be written in the form of a convolution $$\phi_g(x)=\theta_m(x)\otimes[\delta(x-\Delta x/2)+\delta(x+\Delta x/2)], \quad (20)$$

e.g., phase $\phi_g$ in grating 102 at a particular position x is phase $\theta_m$ in mask 101 at position x convolved with split delta functions. When the delta function $\delta(x-\Delta x/2)$ is convolved with a function, it shifts that function by $\Delta x/2$. Taking the Fourier transform, one obtains the efficiency of the phase transfer $\phi_g$ for the mask-to-fiber proximity writing process as a function of the phase spatial frequency f:

$$\phi_g(f)=2\cos(\pi f\Delta x)\theta_m(f), \quad (21)$$

where $\phi_g$ and $\theta_m$ are Fourier transforms of the phase functions of the FBG ($\phi_g$) and mask ($\theta_m$), respectively, (and f is the spatial frequency of the mask or FBG phase pattern. For low spatial frequencies ($f\to 0$), the result reduces to the exact doubling of the mask phase $\theta_m$ to obtain FBG phase $\phi_g$, as described in connection with Equation 13. Next, considering period P of sampling in the phase function, for $\Delta v$=100 GHz channel spacing is $P=c/(2n_{group}\Delta v)$~1.03 mm, where $n_{group}$ is the effective group velocity of the optical signal in the fiber. A convenient scale for spatial frequency is then in units of the channel frequency spacing. Thus, for 100 GHz channel spacing a 'channel' normalized spatial frequency is defined by $$f_c=f/f_0=f\times 1.03\text{ mm}, \quad (22)$$

where $f_0=1/P$ is the spatial frequency corresponding to a single channel spacing, and $P=1.3$ mm.

In an example, if the longitudinal shift at the fiber core $\Delta x$ is 25 $\mu$m (cladding radius of 62.5 $\mu$m and fiber-to-mask spacing $\Delta z$~10 $\mu$m), so the effective mask-to-core spacing in Equation (14) is $\Delta z$ is ~53 $\mu$m), one can then rewrite Equation (21) as $$\frac{\tilde{\phi}_g(f)}{\tilde{\theta}_m(f)}=2\cos(\pi f_c/N_0), \quad (23)$$

where $N_0=P/\Delta x\cong 41$ for $\Delta x=25$ $\mu$m.

Equation 21, which describes the FBG phase spectrum $\phi_g$ as essentially a filtered version of the Fourier transform $\theta_m$ of mask function $\theta_m$, contains a factor of 2. If longitudinal shift $\Delta x$ is zero, then phase $\phi_g$ in grating 102 is twice phase $\theta_m$ in mask 101. But if longitudinal shift $\Delta x$ is not equal to zero, the cosine factor in Equation (21) represents a "transfer amplitude" filtering function that filters out high spatial frequencies of the mask phase upon writing into the fiber core. This is a classic low pass filter. For low spatial frequencies (a mask with constant phase, for example), there is no effect at all, whereas high spatial frequency phase variations are not transferred efficiently to fiber 102, and in fact there is a null for transfer of sinusoidal phase of period $2\Delta x$ on the mask. That is, for a mask-to-fiber separation such that $\Delta x=25$ $\mu$m (a spacing between the mask and fiber cladding of about 10 $\mu$m), if mask 101 has a sinusoidal phase variation whose period is 50 microns, then that phase pattern in mask 101 will not transfer at all to fiber 102; the amplitude of such sinusoidal phase modulation transferred to the fiber will be zero.

Figure 2:
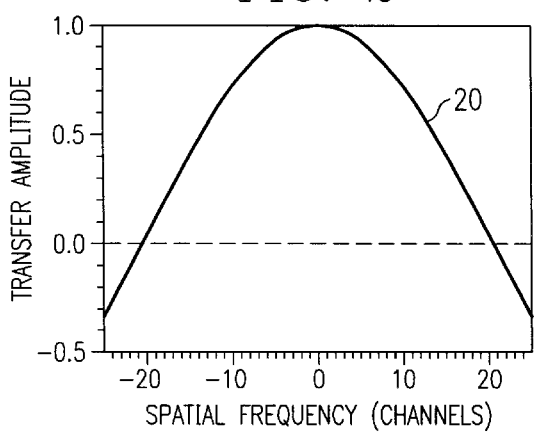
FIG. 2 represents graphically a transfer amplitude filtering function expressed mathematically by Equation (21)

This result, for the illustrative case when longitudinal shift $\Delta x=25$ $\mu$m, is represented graphically in FIG. 2 by transfer function 20. It should be noted that transfer amplitude $\theta_m$ is zero for spatial frequency f corresponding to a $\pm 20.5$ channel shift, e.g., a sinusoidal phase $\theta_m$ on the mask of period 50 $\mu$m will not transfer at all to fiber 102. This follows from the result of Equation (19), since for $\Delta x=25$ $\mu$m the two phase contributions are exactly one-half period apart and therefore have opposite signs and exactly cancel one another.

The first and second terms on the right side of Equation (19) are exact opposites of each other, such that $\phi_g=0$, even though $\theta_m$ is sinusoidally varying by large amplitudes. Equation (21) represents the transfer amplitude function for every spatial frequency of phase $\theta_m$, and that transfer function 20 is represented graphically in FIG. 2 for the particular case of $\Delta x=25$ $\mu$m. For example, consider spatial frequencies corresponding to about $\pm 12$ channels, which are reduced in amplitude by about a factor of two due to diffraction from mask 101 to fiber 102. What is needed to obtain the desired phase in the FBG in this example is to design a pre-compensated mask, such that these high spatial frequencies actually have about twice the amplitude as otherwise. Then, after filtering by transfer function 20, since these high spatial frequencies have been pre-compensated and boosted by the appropriate factor of about two, the desired grating phase function is obtained in fiber 102. The transfer function 20 of Equation (23) allows one to design mask 101 so that the spatial frequencies of the mask phase $\theta_m$ that are not transferred well are boosted. Taking into account the low pass filtering effect of the transfer process as described in Equations (21) and (23), the transferred phase is actually written as desired into the fiber core.

In a method for designing a mask to pre-compensate for the diffractive propagation effects to the fiber core, in accordance with embodiments of present invention, one solves either Equation (21) or (23) for the mask phase $\theta_m$.

$$\theta_m(f)=\phi_g(f)/2\cos(\pi f\Delta x), \text{ or } \theta_m(f_c)=\phi_g(f_c)/2\cos(\pi f_c/N_0). \quad (24)$$

Figure 3:
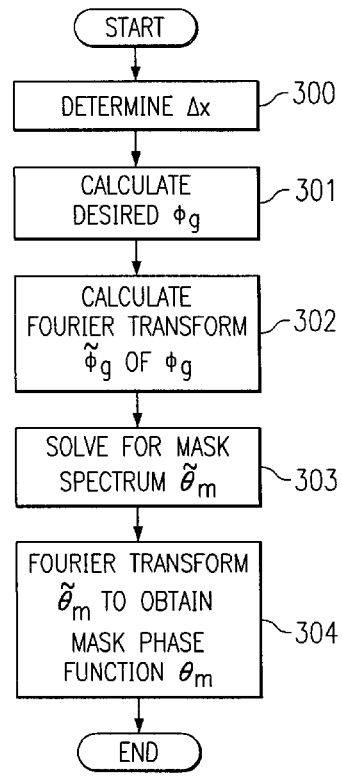
FIG. 3 is a flow diagram depicting a method of designing a precompensated phase mask, in accordance with embodiments of the present invention.
Figure 4A:
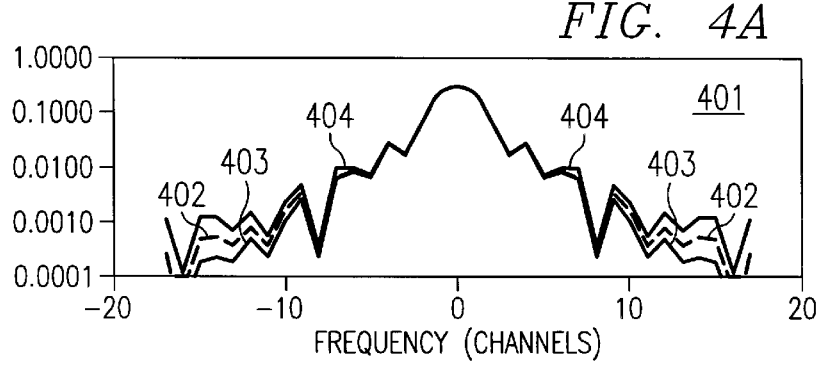
FIGS. 4A–4D depict simulated results obtained using the method exemplified in FIG. 3 for a nine-channel advanced sinc phase-only function.
Figure 4B:
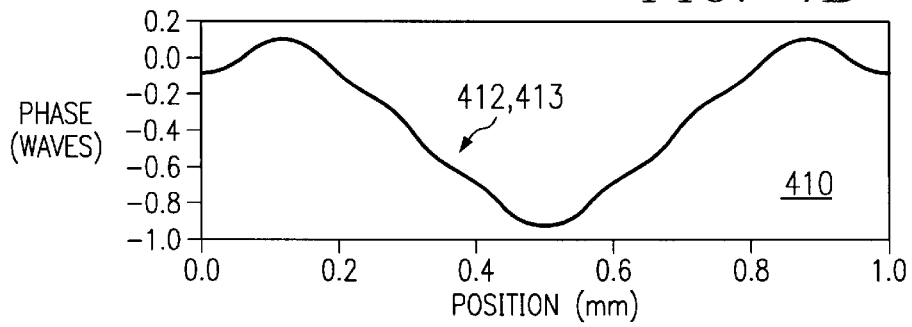
Figure 4C:
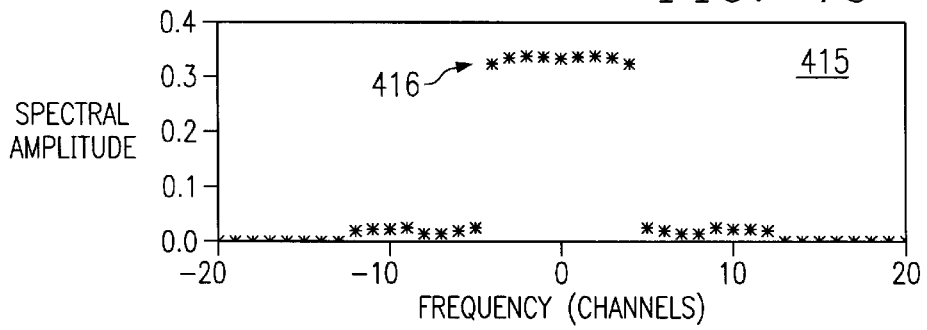
Figure 4D:
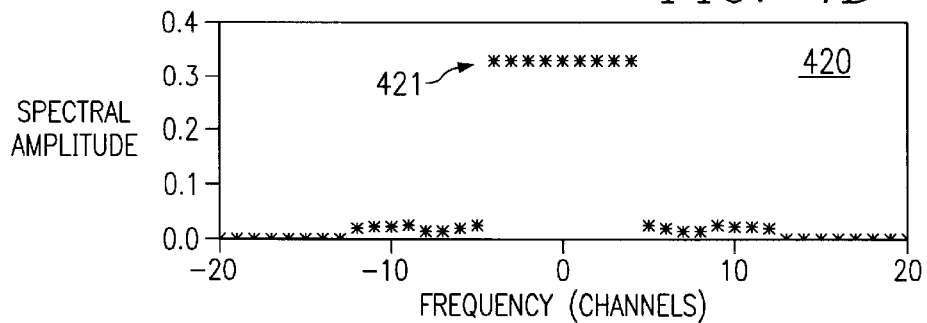
Figure 5A:
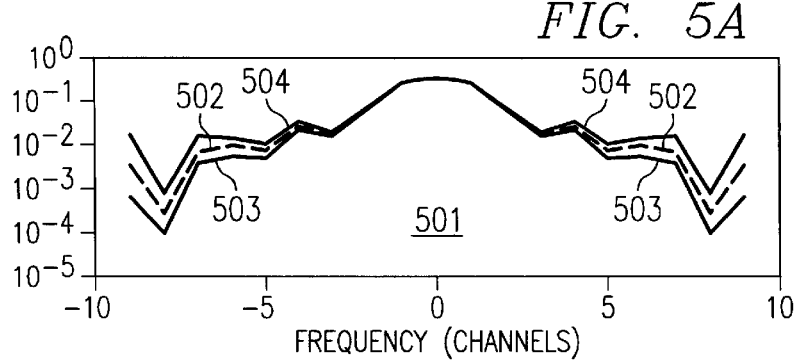
FIGS. 5A–5D depict simulation results analogous to those of FIGS. 4A–4D, but assuming instead a longitudinal shift Δx of 50 μm.
Figure 5B:
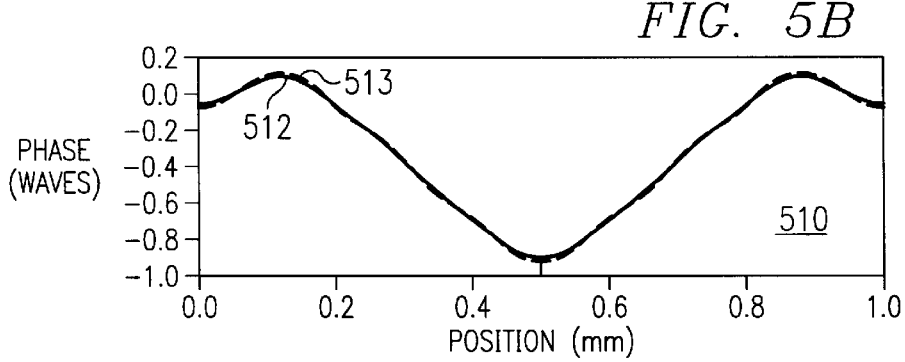
Figure 5C:
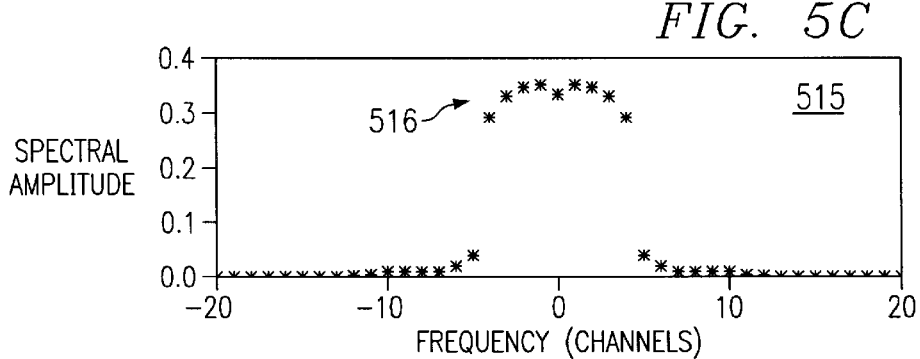
Figure 5D:
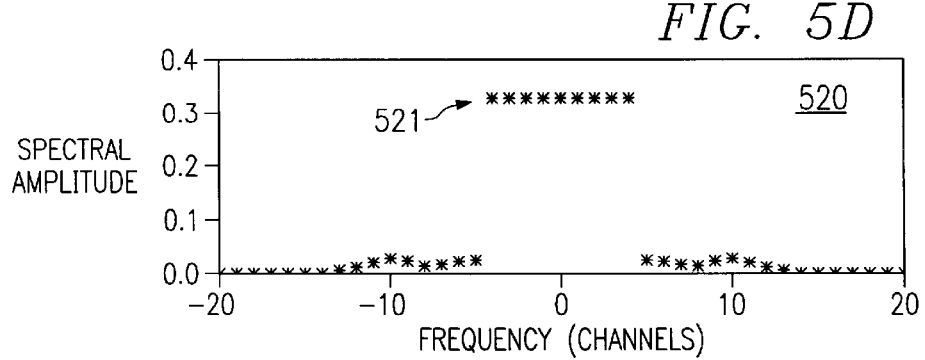

FIG. 3 is a flow diagram depicting a method of designing a pre-compensated phase mask, in accordance with embodiments of the present invention. At step 300, effective longitudinal shift Δx is determined, based on the effective proximity Δz between mask 101 and fiber core 102, according to Equation (14). At step 301, desired FBG phase function $\phi_g$ is calculated. Then at step 302, one calculates the Fourier transform $\phi_g$ of desired FBG phase $\phi_g$, and at step 303 applies Equation (24) to solve for spatial spectrum $\theta_m$ of pre-compensated mask phase $\theta_m$. At step 304, spatial spectrum $\theta_m$ is transformed back to obtain pre-compensated mask phase function $\theta_m$ itself.

As Equation (24) shows, the pre-compensated mask is designed so that its spatial frequencies are boosted by the reciprocal of the cosine function 20 represented in FIG. 2. For example, in the region around channel +/−10 to +/−15, transfer amplitude 20 is reduced by about a factor of 0.5. That is, low spatial frequencies are written into fiber 102 twice as efficiently as are these high spatial frequencies. Where transfer amplitude 20 is small or zero, one would be dividing by a near-zero value in Equation (24), which could lead to inaccurate or unphysical results. Therefore the method depicted in FIG. 3 is limited primarily to regions where the transfer function is not close to zero.

FIGS. 4A–4D depict simulated results obtained using the method exemplified in FIG. 3 for a nine-channel phase-only sampling function (see U.S. patent aplication Ser. No. 09/757,386, the disclosure of which has been incorporated herein by reference). Top panel 401 shows mask phase spectrum $\theta_m$ 402 (central dashed curve), which is the Fourier transform of phase function $\theta_m$; the effect of diffraction transfer from mask 101 to FBG 102 when longitudinal shift Δx is assumed to be 25 μm reduces the higher spatial frequencies according to Equation (23) (as shown in lower solid curve 403). Solid top curve 404 shows the spectrum $\theta_m$ of phase function $\theta_m$ when precorrected upward according to Equation (24). Second panel 410 shows actual mask phase function $\theta_m$ with (solid curve 412) and without (dots 413) precorrection. It is noted that curve 412 and dots 413 are nearly indistinguishable. Third panel 415 shows the effect of diffraction on channel reflection amplitudes 416, which is given by the Fourier transform of the FBG sampling function FT{$S(x) \equiv \exp[i\phi_g(x)]$}, when mask phase $\theta_m$ has not been pre-corrected, exhibiting an observable roll off of the outlying channels. Bottom panel 420 shows the channel amplitudes FT{$\exp[i\phi_g(x)]$} 421, when the precorrection of Equation (24) is applied to mask phase $\theta_m$. The roll off of high spatial frequencies from diffraction offsets the precorrection boost, resulting in the recovery of a substantially uniform channel spectrum.

This effect is more pronounced in FIGS. 5A–5D, which depict simulation results analogous to those of FIGS. 4A–4D, but assuming instead a longitudinal shift Δx of 50 μm. Top panel 501 shows spectrum $\theta_m$ of phase $\theta_m$ (central dashed curve 502), including the effect of the roll off from diffraction effects (lower solid curve 503), and including pre-compensation using Equation (24) (solid upper curve 504). Panel 510 shows phase $\theta_m$ before (solid curve 512) and after pre-compensation (dashed curve 513). Here, solid curve 512 and dashed curve 513 are clearly distinguishable. Panels 515 and 520 show FBG channel spectral amplitudes FT{$\exp[i\phi_g(x)]$} 516 and 521 without and with pre-compensation, respectively.

From Equation (23), it can be recognized that masks designed with low spatial frequency phase functions experience a much smaller distortion effect from diffraction. It is important to note that sampling phase functions $\theta_m$ with low spatial frequency can nevertheless generate high channel counts. Illustratively, a simple sinusoidal grating phase function $\phi_g$ with a period equal to the sampling period P (i.e. $f_c=1$) can be written as $$\phi_g = 2\theta_m(x) = \phi_0 \sin(2\pi x/P), \quad (25)$$

and in the absence of diffraction FBG sampling function $S(x) = \exp[i\phi_g(x)]$ can be written as $$S(x) = \exp[i\phi_g] = \exp[i\phi_0 \sin(2\pi x/P)] = \Sigma^\infty_{m=-\infty} J_m(\phi_0) \exp[im2\pi x/P], \quad (26)$$

where $J_m(\phi_0)$ are Bessel functions of m order. The spectral envelope of the multiple channels generated by this sampling function $S(x)$ is given by its Fourier transform $\tilde{S}(f) = FT\{S(x)\} = FT\{\exp[i\phi_g(x)]\}$. Since Equation (26) is written as a Fourier series, each term in the summation corresponds to a single channel, and thus the amplitude of the $m^{th}$ channel is simply given by the coefficient $J_m(\phi_0)$.

The number of grating channels generated by sampling function $S(x)$ is approximately $\pm\phi_0$. Therefore, even though phase function $\phi_g$ has only spatial frequency of 1 channel (normalized frequency $f_c=1$, or $f=f_0$) the number of channels generated is $2\phi_0$, which can be large if $\phi_0 \gg 1$. Since the spatial frequency is very low, the distortion effect of diffraction predicted by Equation (23) will be negligible. If Δx=25 μm, diffraction simply reduces the phase variation $\phi_0$ by a factor $\cos(\pi/41)=0.997$. Essentially the number of channels, approximately twice $\phi_0$, is determined by Bessel functions coefficients in Equation (26). Although this approach of using a very low spatial frequency can in principal generate a large number of channels with essentially no penalty from diffraction transfer effects, these channels are typically not uniform.

It is desired to achieve a uniform channel spectrum while minimizing the spatial Frequencies required (and thereby minimizing the effect of diffraction). This can be accomplished in accordance with embodiments of the present invention by first writing FBG grating phase function $\phi_g$ as a more general truncated Fourier series:

$$\phi_g(x) = \Sigma_{n-1}^M \alpha_n \cos(2\pi nx/P + \beta_n) \quad (27)$$

where the number M of terms in the series is minimized, and then $\alpha_n$ and $\beta_n$ are optimized such that the channel spectrum is substantially uniform over the band of interest. With M terms in this series, generally at least 2M substantially uniform channels can be achieved, since there are two free parameters $\alpha_n$, $\beta_n$, for each term.

In Equation (27), to generate a uniform channel spectrum one includes the harmonics of the fundamental period P in the sampling. These represent higher spatial frequencies. Equation (27) truncated Fourier series contains sines or cosines from n=1 to M, and the periods of these are in fractions of the sampling period P. In Fourier series, Equation (27), the first harmonic has the period P of the sampling itself, which for example is one millimeter, and $2^{nd}$, $3^{rd}$, $4^{th}$, etc. harmonics have periods P/2, P/3, P/4, etc. Therefore the nth harmonic corresponds to the nth channel around the center frequency in the spectral domain. These higher spatial frequencies, because of the transfer diffraction effect, experience increasingly diminished transfer amplitudes. In fact, at N=20.5, or around 20 or 21, there is no transfer, such that if M is close to 20.5, those frequencies are not transferred to the fiber. It is advantageous to minimize number M of channels, because higher M frequencies are harder to transfer into the fiber, based on Equation (23). Boosting high frequency terms having very small transfer amplitude according to Equation (24) reduces accuracy similarly to division by zero. For example, if Δx changes by a small fraction near zero transfer amplitude, the denominator in Equation 24 is near zero and thus the compensation is very sensitive to longitudinal shift Δx, which demands extremely precise control of distance Δz between fiber 102 and mask 101.

To minimize M, there are available for each of the terms which correspond to harmonics of the Fourier decomposition of phase function $\phi_g$ an amplitude represented by $\alpha_n$ and a phase represented by $\beta_n$. To evaluate the $\{\alpha_n, \beta_n\}$ parameter array, one would use a (for example nonlinear) optimization algorithm such as simulated thermal annealing, using as the optimization criteria the uniformity of the desired channels and other desired criteria (such as the minimization of undesired adjacent channels). A variety of such mathematical techniques are available to optimize the sampling function S(x), defined in Equation (26) as $S(x)=\exp[i\phi_g]$, where $\phi_g$ is now defined in Equation (27). The Fourier transform of S(x) is $\tilde{S}(f)$ and represents an envelope of the FBG reflection channel spectrum similar to those shown in panels 420 and 520 of FIGS. 4 and 5 respectively. During each iteration of the optimization algorithm, $\alpha_n$ and $\beta_n$'s in Equation (27) are generated, and Fourier transform $\tilde{S}(f)$ is evaluated. The algorithm is able to optimize the uniformity of desired channels to some level of approximation. Depending on how large M is, optimization is achieved very well or very poorly. If M=1 for 80 channels for example, optimization is achieved only very poorly. The general principle is that the number of free parameters $\{\alpha_{n,\beta n}\}$ must equal or exceed the number of simultaneous equations. Essentially, for each channel in a uniform set, a free variable is needed. To generate N substantially uniform channels, if there are two free variables for each term in expansion Equation (27), typically M must be on the order of N/2.

Once an optimized design for $\phi_g$ has determined the $\alpha_n$ and $\beta_n$ parameters, one can then apply Equation (24) to obtain pre-compensated mask phase $$\theta_m(x) = \frac{1}{2}\sum_{n=1}^{M} \frac{\alpha_n}{\cos(\pi n/N_0)} \cos(2\pi nx/P + \beta_n), \quad (28)$$

where the value $N_0 = P \Delta x \equiv 41$ for the example case of Δx=25 μm. In this case, one recognizes that the 1/cosine correction factor in the denominator causes Equation (28) to diverge for n→$N_0$/2=20.5, and thus this approach can be problematic for such phase designs. The above assumption that the channel count N is limited to ~2M indicates that uniform channel counts approaching 40 would be difficult. However, if one could achieve acceptable uniformity for 40 channels with M less than 20, then the solution of Equation (28) would be practical. It should be noted, however, that for M approaching the singularity at n=20.5 in Equation (28), the sensitivity to mask-fiber spacing becomes quite severe.

One further aspect of the 1/cosine correction factor in Equations (24) and (28) is that for spatial frequencies higher than the singularity at n=$N_0$/2, the transfer amplitude recovers from zero, albeit with negative sign. It returns to full amplitude when $f_c = N_0$ or f=1/Δx. Physically this occurs, because the phase contributions from locations separated by longitudinal gap Δx, which is now equal to a full period, add constructively. Therefore, such higher spatial frequency terms in Equation (28) could potentially be used to generate large uniform channel counts, since inclusion of these terms would increase the number of degrees of freedom in the optimization algorithm.

Since Equation (28) represents the mask phase $\theta_m$, the Fourier transform of the nth term is exactly the spatial frequency of $nf_0$ or the normalized frequency of the nth channel. Substituting the Fourier transform of Equation (28) into Equation (23), one obtains phase $\phi_g$ represented by Equation (27) in the fiber grating for a desired longitudinal shift Δx. Each term in Equation (28) is boosted in mask 101 by substantially the amount that it will be reduced in the transfer process as described by Equations (21) and (23).

Figure 6A:
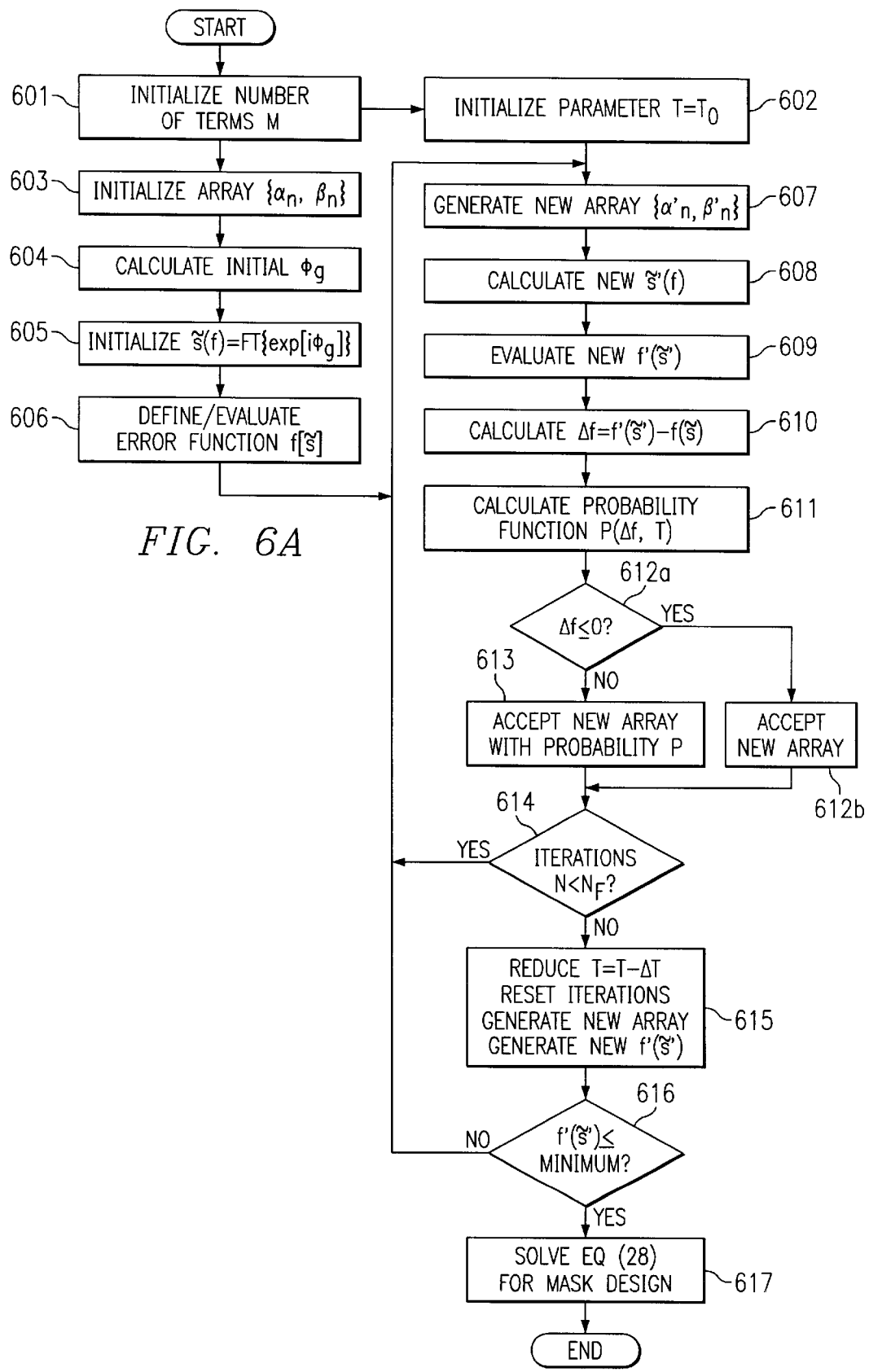
FIG. 6A is a flow diagram illustrating a method of generating a phase mask design for a multi-channel FBG using an optimization algorithm, according to embodiments of the present invention.

FIG. 6A is a flow diagram illustrating a method of generating a phase mask design for a multi-channel FBG using an optimization algorithm, according to embodiments of the present invention. At step 601 the maximum number M of terms in Fourier series Equation (27) is initialized. The value of M can be determined manually, for example, or by calculation, e.g., M=N/2, where N is the desired number of reflective FBG channels. Alternatively, M can be selected randomly or based on other considerations, or can be indexed such that it is automatically incremented or decremented in the course of the optimization process. At step 602 a parameter T, representing an adjustable "pseudo-temperature" parameter, is set at an initial positive value $T=T_0$.

After step 601, an initial parameter array $\{\alpha_n, \beta_n\}$, having array dimension consistent with the value of M, is generated at step 603. The initial values of the individual parameters $\{\alpha_n, \beta_n\}$ can be, for example, manually or randomly generated. At step 604 an initial value of FBG phase $\phi_g$ is calculated using the initial values of M and parameter array $\{\alpha_n, \beta_n\}$ in Equation (27). At step 605 a Fourier transform of $S(x)=\exp[i\phi_g(x)]$ using the result $\phi_g$ of step 604 is performed to generate an initial envelope channel reflectivity spectrum $\tilde{S}(f)$ of FBG 102. Optionally steps 604 and 605 may be combined to directly generate channel reflectivity spectrum envelope $\tilde{S}(f)$ without explicitly calculating intermediate result $\phi_g$.

At step 606 an error fiction $f[\tilde{S}(f, \{\alpha_{n,\beta n}\})]$ is defined and is evaluated for initial channel reflectivity spectrum $\tilde{S}(f)$. Error function $f[\tilde{S}(f, \{\alpha_n, \beta_n\})]$ is preferably constructed to attain a minimum absolute value, e.g., zero, when the desired envelope channel reflectivity spectrum $\tilde{S}(f)$ is achieved. An example of such an error function is $$f(x) = \sum_{m=-M}^{M} (I_m(x) - \kappa_m I)^2,$$

where I is a weighted average channel intensity and the $K_m$ weights can be ones and zeros, depending on whether a particular channel m is desired or not (see U.S. patent application Ser. No. 09/757,386, the disclosure of which has been incorporated herein by reference), or these weights can take on any desired value.

At step 607 the initial array of parameters $\{\alpha_{n,\beta n}\}$ is adjusted to produce a new array of parameters $\{\alpha'_n, \beta'_n\}$ according to a distribution function, e.g., random variations from the initial values $\{\alpha_n, \beta_n\}$. From these new parameter values, a new channel reflectivity spectrum $\tilde{S}'(f)$ is generated at step 608, and a new value of error function $f(\tilde{S}')$ is calculated at step 609. At step 610 a difference $\Delta f = f(\tilde{S}') - f(\tilde{S})$ between the new and previous error functions is calculated. At step 611 a probability function defined by $P(\Delta f) = \exp(-\Delta f/T)$ is calculated, where T is the adjustable pseudo-temperature parameter initialized at step 602.

At step 612a, if $\Delta f \leq 0$, the new array of parameter values $\{\alpha'_n, \beta'_n\}$ are always accepted at step 612b to replace the old array of parameter values. At step 613 if $\Delta f > 0$, then the new array of parameter values will be accepted to replace the old parameter values on a statistical basis with a probability P($\Delta f$), such that in m iterations of the algorithm through step 613 the new array of parameter values would be accepted randomly mP($\Delta f$) times and rejected the other m [1−P($\Delta f$)] times. If the number of iterations N completed at step 614 is less than a preselected iteration number $N_F$, then steps 607 through 614 are repeated until preselected iteration number $N_F$ is reached. Next at step 615, adjustable pseudo-temperature parameter T is reduced by $\Delta T$, and a new array of initial parameter values are generated based on the results from preceding iterations of steps 607 through 614. At step 615, error function f is recalculated based on the new array of parameter values, and the number of iterations is reset to zero.

At step 616, if error function $f(\tilde{S}')$ is less than an acceptable minimum value, the process is complete, and at step 617 the latest parameter values are used in Equation (28) to solve for pre-compensated phase mask design $\theta_m$. Alternatively, the value of M is incremented or decremented, and the algorithm is repeated to seek a more optimum solution. If at step 616 error function $f(\tilde{S}')$ is greater than the acceptable minimum value, then the algorithm repeats from step 607 through step 616, until a set of acceptable parameter values are generated.

Parameter T is analogous to a temperature, and the probability function P($\Delta f$) is analogous to a probability function of a thermal energy for different parameter values. Accordingly, the above algorithm simulates a slow cooling process to reduce thermal energy. The algorithm depicted in FIG. 6A can be applied numerically, advantageously using a digital computer.

Both Fresnel-Kirchoff diffraction equations and free space propagation of the angular spectrum, which are based on scalar theory, adopt the Kirchoff boundary condition assuming that the UV beam passing through the phase mask simply receives phase shifts introduced by the phase mask corrugation structure without changing the amplitude. This classical assumption in the scalar theory of diffraction is no longer accurate when the phase mask period is less than 10 times wavelength, which is the case of the FBG mask writing system, where the period of the phase mask is four times the UV wavelength.

It will be noted that the above analysis leading to the results of Equations (21) and (23) is an approximation of the complex diffraction effects which occur between the mask and fiber. For example, it is assumed that the phase variation in the mask design results in pitch variations which are much smaller than the underlying mask pitch (typically about 1 $\mu$m). Should such phase variations occur, or if for other reasons the above approximate analysis could be inadequate, then an alternative embodiment of the design procedure could make use of a more complete diffractive analysis method. The simple approximation of the diffraction analysis described above has the advantage of a very rapid calculation method. If the results are not sufficiently accurate, then a more complex and time consuming calculation method also within the scope of the present invention may be necessary.

Also within the scope of the present invention, a few such methods are based in part for example on principles of scalar diffraction such as the angular plane wave spectrum method (see for example J. W. Goodman, "Introduction to Fourier Optics," Chapter 3, McGraw Hill, N.Y., 1968, p. 38–54), or finite difference in time domain (FDTD) methods (see for example H. Ichikawa, "Electromagnetic Analysis Of Diffraction Gratings By The Finite-Difference Time-Domain Method", Journal of the Optical Society of America A, Vol. 15, (1998) pp. 152–157.

The Finite Difference in the Time Domain (FDTD) method provides numerical solution of the complete vector set of Maxwell's equations. The method uses no approximation, but can suffer from digital computation errors, such as that in the digitization of the phase mask profile input and optical field output. The positions of the split phase steps can be estimated by the relation $\Delta x = 2\Delta z \tan \theta_o$, where $\theta_o = 13.18°$ is the diffraction angle of the first order and z is the distance from the phase mask, as shown in FIG. 1. The accurate separation data computed by the rigorous numeric solution are slightly smaller than the approximation of geometric optics.

With such diffractive analysis method, one can calculate both the amplitude and the phase of the intensity fringe pattern generated at the plane of the fiber core by a particular mask trial phase function $\theta_m$. To apply this alternative approach, the intensity pattern Equation (18) of the light transmitted through the mask in the plane of the fiber core is rewritten as $$I_{fiber}(x) = I_{ave} + I_{amp}(x) Re\{\exp[i(k_{g0}x + \phi_I(x))]\} \qquad (18A)$$

where the amplitude and phase of the intensity fringes are given by the quantities $I_{amp}(x)$ and $\phi_I(x)$, respectively. Since the index variation in the FBG is proportional to this intensity, Equation (18A) can be compared to Equation (12) to find that FBG amplitude $n_g(x)$ is proportional to $I_{amp}(x)$ and FBG phase $\phi_g(x)$ is given by intensity fringe phase $\phi_I(x)$. Thus the sampling function S(x) without any loss of generality is rewritten as the complex function representing the intensity fringes $$S(x) = I_{amp}(x)\exp[i\phi_I(x)] \qquad (26A)$$

The Fourier transform of the sampling function S(x) then gives the envelope of the multiple channel reflectivity spectrum of the FBG, $$\tilde{S}(f) = FT\{I_{amp}(x)\exp[\phi_I(x)]\} \qquad (26B)$$

where FT indicates the Fourier transform. Therefore, this result will permit a more accurate calcalation of the effect of mask diffraction on the spectral envelope of the multiple FBG channels. If the result of the procedure depicted in FIG. 6A is not sufficiently accurate, then the mask function according to FIG. 6A can be used as a starting point for a modified and more accurate optimization, based on iteratively varying the $\{\alpha_n, \beta_n\}$ parameter array as described in connection with FIG. 6A and then calculating $I_{fiber}(x)$ and $\tilde{S}(f)$ with a more accurate diffraction method.

Figure 6B:
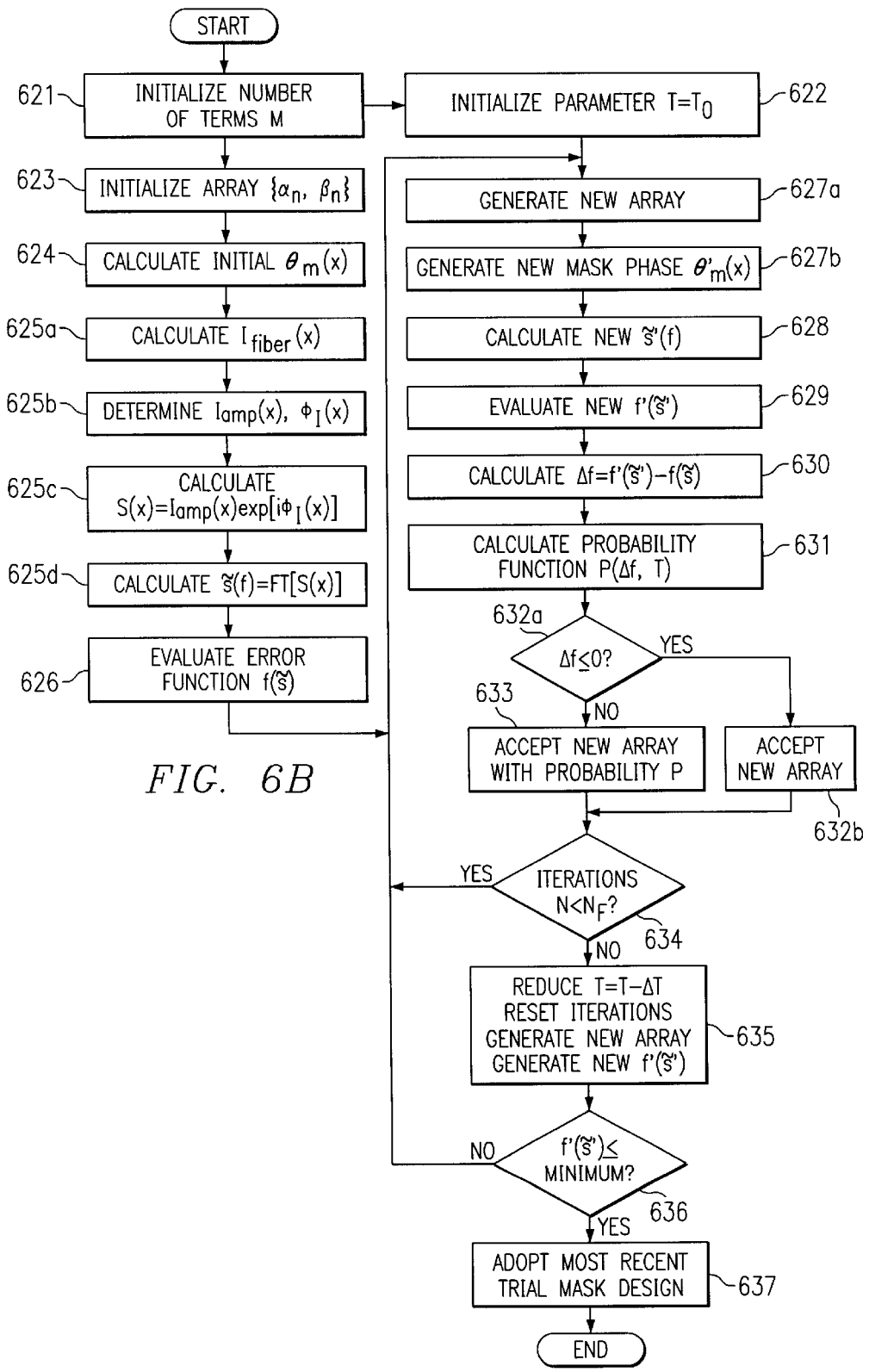
FIG. 6B is a flow diagram depicting a modified mask design method similar to that shown in FIG. 6A, according to embodiments of the present invention.

FIG. 6B is a flow diagram depicting a modified mask design embodiment based on the approach described in connection with Equations (18A), (26A), and (26B) similar to that shown in FIG. 6A. At respective steps 621, 622, and 623, similar to steps 601, 602, and 603 of FIG. 6A, the initial number of terms M, initial parameter T=T0, and initial parameter array $\{\alpha_n, \beta_n\}$ are chosen. However, at step 624, an initial mask phase $\theta_m(x)$ is defined instead of the FBG phase $\phi_g(x)$, based on the initial array of $\{\alpha_n, \beta_n\}$.

$$\theta_m(x) = \Sigma_{n=1}^M \alpha_n \cos(2\pi n x/P + \beta_n). \qquad (27A)$$

In steps 625a–625d, the phase design $\theta_m(x)$ is used to calculate the initial spectral envelope $\tilde{S}(f)$ as follows. First, at step 625a, the intensity pattern of the light transmitted through the mask to the fiber core $I_{fiber}(x)$ is calculated according to Equation (18A) by a more accurate diffraction method, for example angular spectrum propagation, or FDTD. From the intensity written in the form of Equation (18A) the quantities $I_{amp}(x)$ and $\phi_f(x)$ are determined at step 625b, and thus the initial spectral envelope $\tilde{S}(f)$ can be calculated by applying Equations (26A) and (26B) at steps 625c and 625d respectively. Alternatively, if necessary an even more accurate calculation of $\tilde{S}(f)$ can be obtained from sampling function S(x) at step 625d using the transfer matrix method (see for example T. Erdogan, "Fiber Grating Spectra," Journal of Lightwave Technology, Vol. 15, p. 1277–1294) instead of Fourier transform. This may be advantageous for FBGs designed with very high reflectivity, or when the underlying FBG design incorporates rapidly varying chirps or phase shifts.

In step 626, f($\tilde{S}$) is evaluated on the basis of desired criteria, such as channel uniformity and minimization of the amplitudes of unwanted channels. Based on this evaluation, parameter array. $\{\alpha_n, \beta_n\}$ is modified according to an optimization method such as the previously described simulated thermal annealing method. In step 627a a new $\{\alpha_n \beta_n\}$ array is generated, which is used in step 627b to calculate new $\theta'_m(x)$. Then in step 628 $\theta'_m(x)$ is used to calculate new $I'_{fiber}(x) = I'_{amp}(x)$, $\phi'_f(x)$, S'(x) and new spectral envelope S'(f) in a manner identical to that used in steps 625a–625d. In step 629, the new spectral envelope is then again evaluated according to desired criteria. The iterative nonlinear optimization process continues analogously with that of FIG. 6A, until the criteria for an adequate spectral envelope are met. Note that unlike step 617 in FIG. 6A, a calculation is no longer required, since in steps 624 and 627 the trial mask phase design $\theta_m(x)$ is explicitly evaluated. Thus, if the criteria for the spectral envelope are met, then at step 637 the final mask design adopted is simply the most recent trial mask phase function $\theta_m(x)$.

The calculations depicted in FIGS. 6A and 6B are performed numerically, preferably using a digital computer.

Figure 7A:
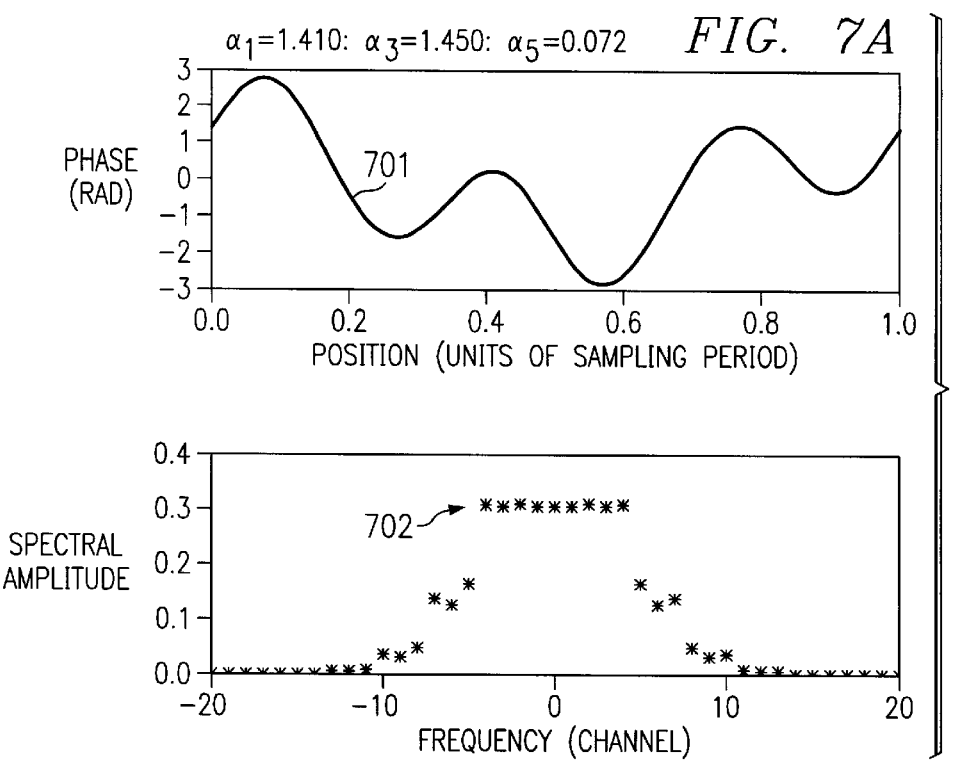
FIGS. 7A–7C represent graphically phase functions and associated channel spectra of a 9-channel FBG in accordance with embodiments of the present invention.
Figure 7B:
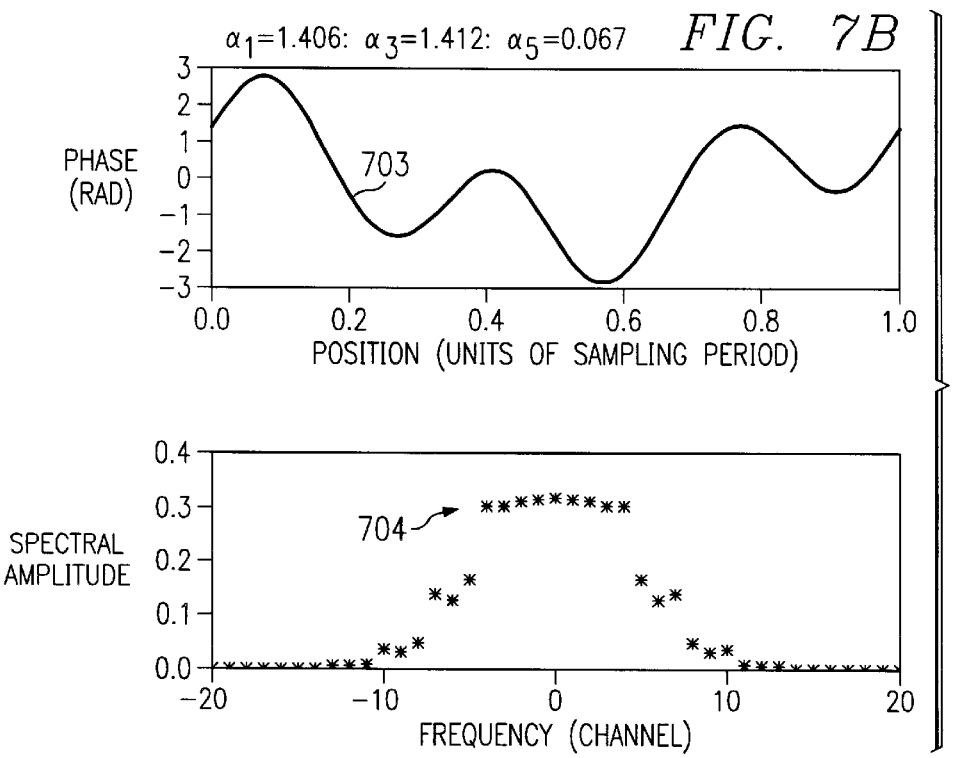

In an example according to embodiments of the present invention, the method of the above algorithm of FIG. 6A can be applied to the design of a 9-channel FBG having a fiber phase $\phi_g$ given by $$\phi_g(x) = 1.41 \cos(2\pi \cdot x/P) + 1.45 \sin(2\pi \cdot 3x/P) + 0.072 \sin(2\pi \cdot 5x/P), \quad (29)$$

where $\alpha_1 = 1.41$, $\alpha_3 = 1.45$, $\alpha_5 = 0.072$, and all other $\alpha_n$ and $\beta_n$ parameters are zero. Simulated results for this fiber phase $\phi_g$ and the associated channel spectrum $\tilde{S}(f)$ are represented graphically in FIG. 7A by envelopes 701 and 702 respectively. The nearly ideal amplitude uniformity over the 9 channels is within ~2 per cent. Including the diffraction effects of propagation, where the assumed longitudinal shift $\Delta x$ is 25 $\mu$m, FBG phase coefficients in Equation (29) are modified according to Equation (23): $\alpha_1 = 1.406$, $\alpha_3 = 1.412$, and $\alpha_5 = 0.067$. The resulting phase $\phi_g$ and channel spectrum $\tilde{S}(f)$ are represented graphically in FIG. 7B by envelopes 703 and 704 respectively, and the uniformity is degraded to ~5 percent.

Figure 7C:
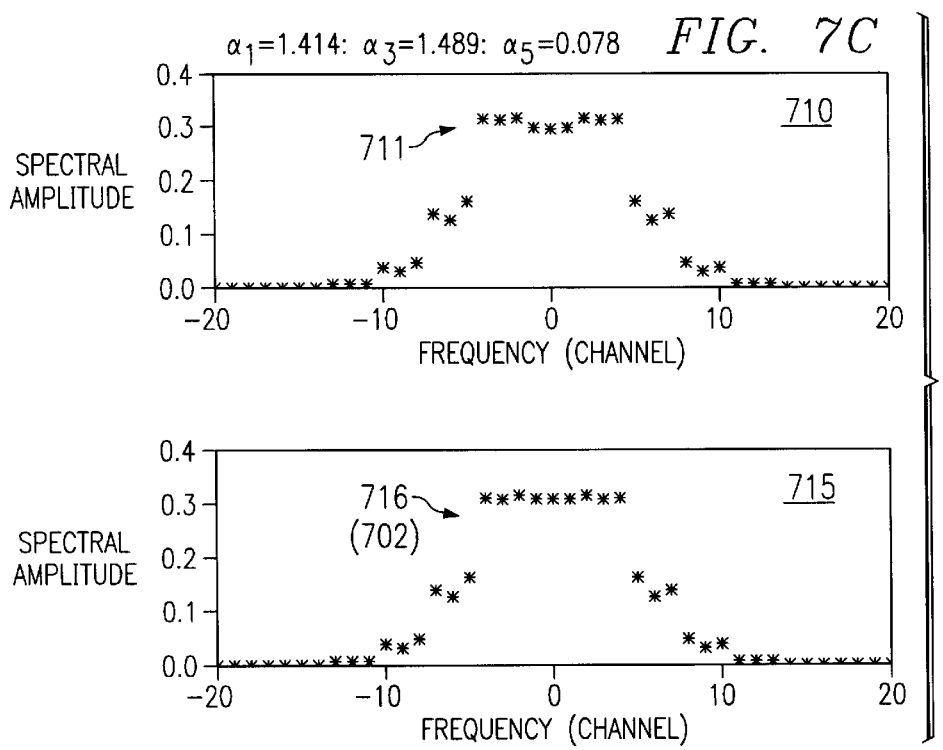

Next, Equation (28) is applied to pre-compensate mask phase $\theta_m$ such that Equation (29) is recovered after including the propagation effects. Top panel 710 of FIG. 7C represents graphically channel spectrum $\tilde{S}(f)$ having envelope 711, using a pre-compensated mask, where longitudinal shift $\Delta x = 25$ $\mu$m is assumed (grating phase coefficients $\alpha_1 = 1.414$, $\alpha_3 = 1.489$, and $\alpha_5 = 0.078$), but without the diffraction effect of propagation. Lower panel 715 of FIG. 7C graphically represents in envelope 716 that the ideal channel spectrum $\tilde{S}(f)$ (envelope 702 of 7A) is recovered using the pre-compensated phase coefficients when diffraction effects are included. The results of FIGS. 7A–7C will differ for differing mask-to-fiber spacing $\Delta z$, for example a longitudinal shift $\Delta x$ of 50 $\mu$m, but the same design method applies. For example at envelope 716 of FIG. 7C, pre-compensation again recovers the ideal channel spectrum $\tilde{S}(f)$ of envelope 702 in FIG. 7A.

In the embodiments of both FIGS. 6A and 6B, the optimization procedure is essentially the minimization of a nonlinear error function by variation of the parameter array $\{\alpha_n \beta_n\}$. The example of the nonlinear optimization procedure given in FIGS. 6A and 6B is that of the simulated annealing method, which is generally a good approach to finding the global minimum of an error function, and does not easily get trapped in local minima. However, there are a number of other numerical optimization procedures which may be more rapid or easier to implement. These include methods such as the simplex method, Powell's method, conjugate gradient method, variable metric method, and linear programming methods. A summary of these methods can be found, for example, in "Numerical Recipes in C, the Art of Scientific Computing," by W. H. Press et al., Cambridge University Press, New York, pp. 394–444, 1988. Such optimization methods are also applicable to the further embodiment described below.

In a further embodiment, a design based on discrete $\pi$ phase shifts in the FBG is used. To make a phase shift of $\pi$ in the FBG, the change in index of refraction in the grating varies sinusoidally positive and negative and then positive and then negative, but with a $\pi$ phase shift at a zero crossing, the sinusoid goes negative and then instead of going positive, it goes negative again, producing a mirror image index around the $\pi$ shift. A $\pi$ phase step can occur anywhere in the sinusoid. If a $\pi$ phase shift occurs at the maximum or the minimum, there is a discontinuous change in the amplitude. When the it phase shift occurs where the sinusoid crosses through the average index, the sinusoid amplitude is unchanged, but the slope changes discontinuously.

Figure 8A:
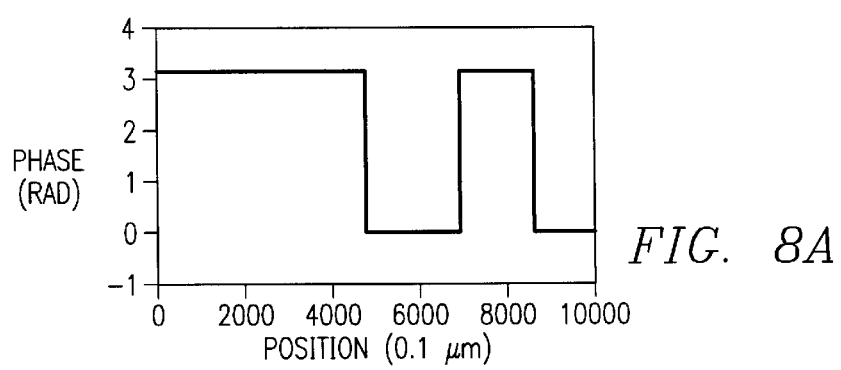
FIGS. 8A–8B depict a Dammann sampling function, consisting of 4 phase shifts of π at the specific locations, and the resulting 7 peaks in the FBG channel spectrum.
Figure 8B:
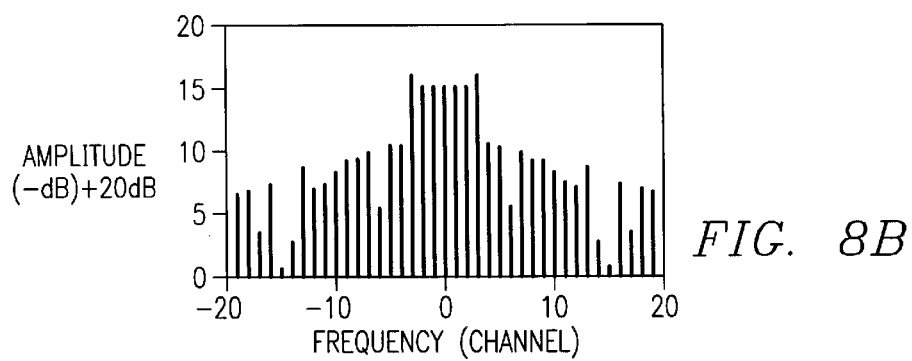
Figure 9A:
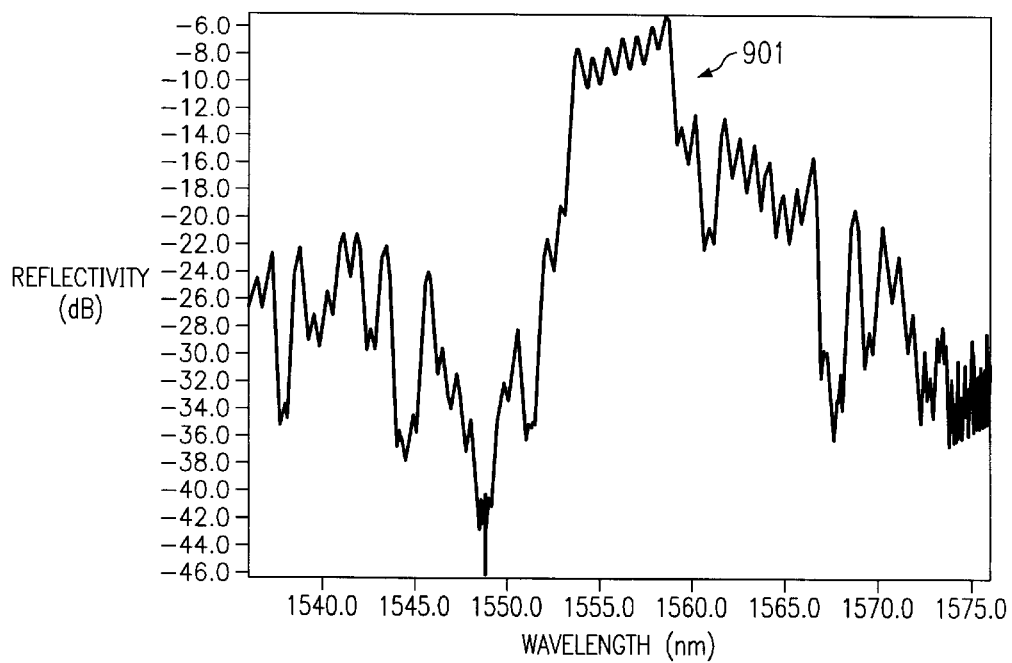
FIGS. 9A–9D show the experimental reflection spectra of sampled FBGs written with phase mask to fiber spacings Δz of 10, 40, 70 and 100 μm, respectively, illustrating increasing asymmetry of multi-channels with spacing Δz.
Figure 9B:
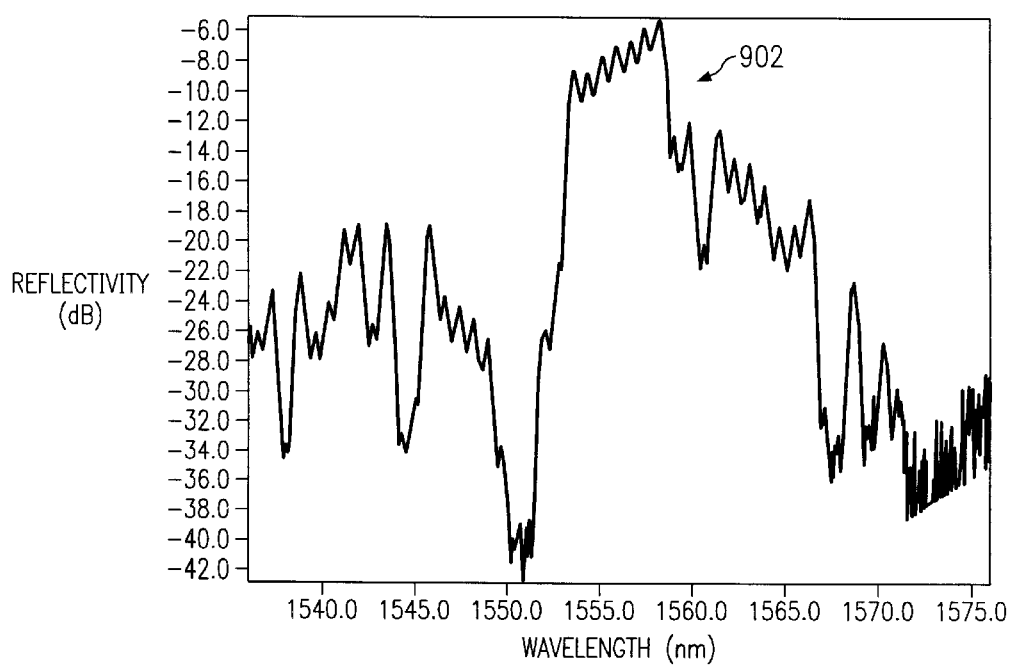
Figure 9C:
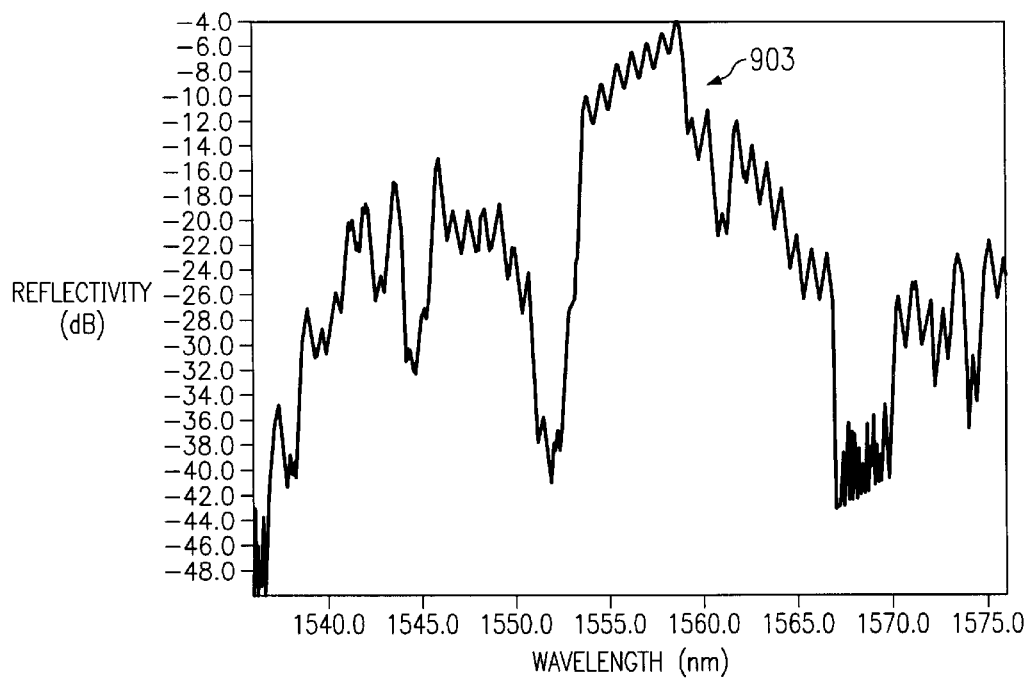
Figure 9D:
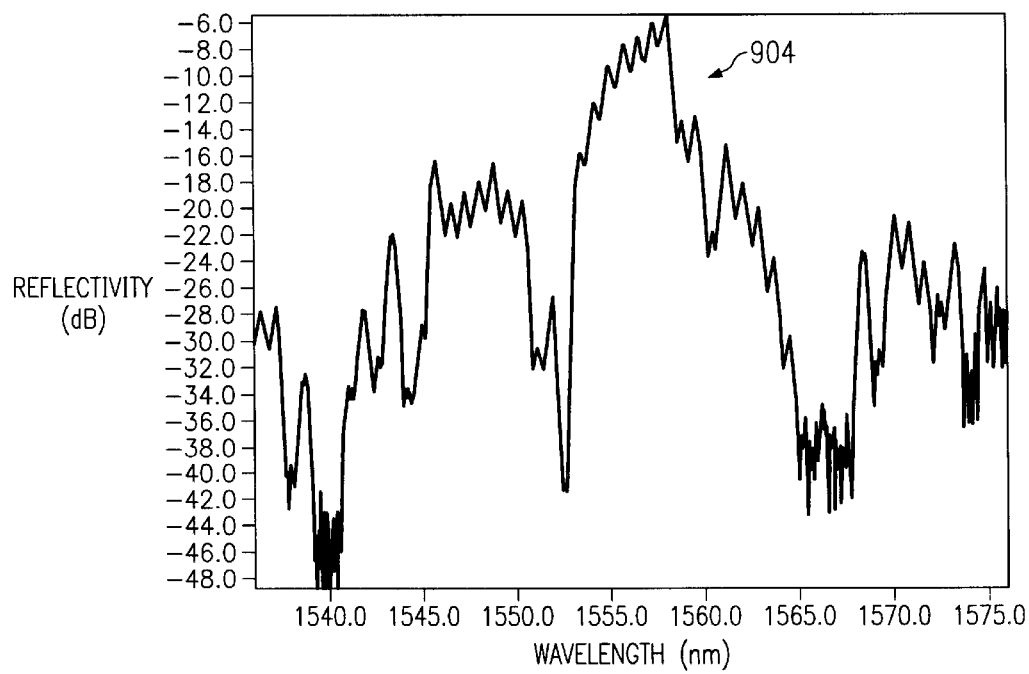
Figure 10A:
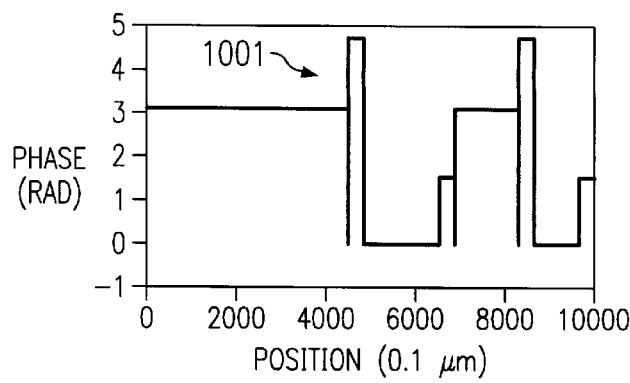
FIGS. 10A–10H illustrate computer simulation results of the Fourier transform of deformed sampling functions with additional π/2 and 3π/2 phase shifts showing multiple peaks with roll off asymmetry, for different phase mask to fiber spacings Δz, in good agreement with experimental results shown in FIGS. 9A–9D.
Figure 10B:
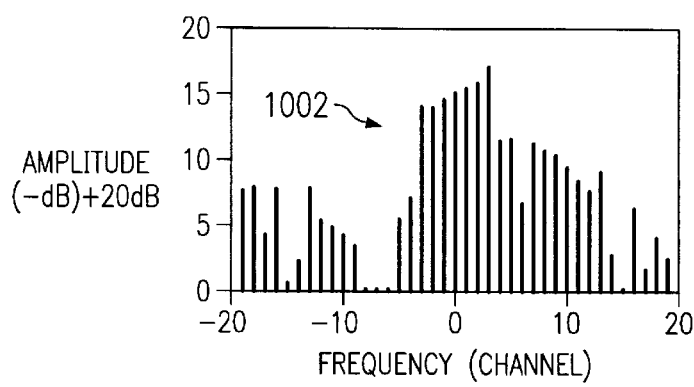
Figure 10C:
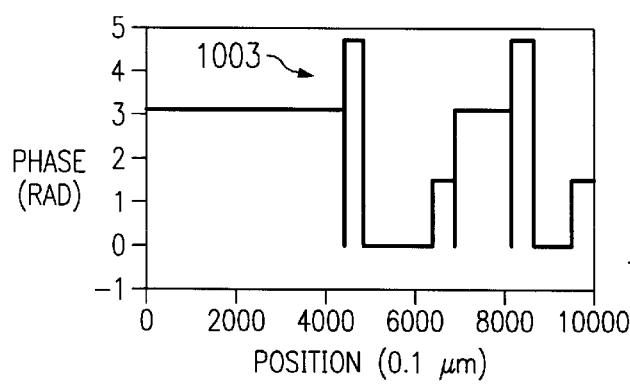
Figure 10D:
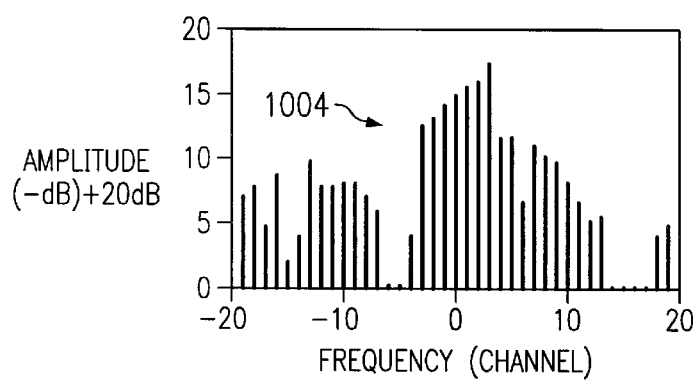
Figure 10E:
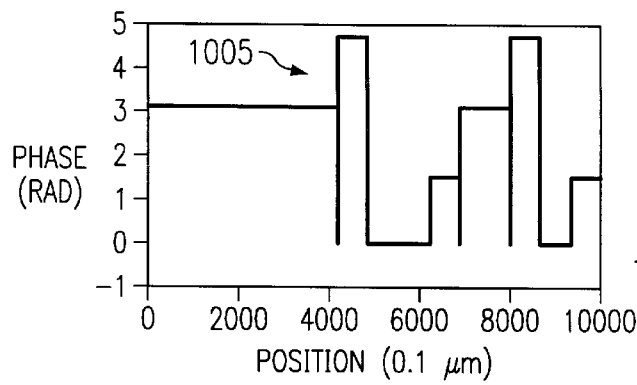
Figure 10F:
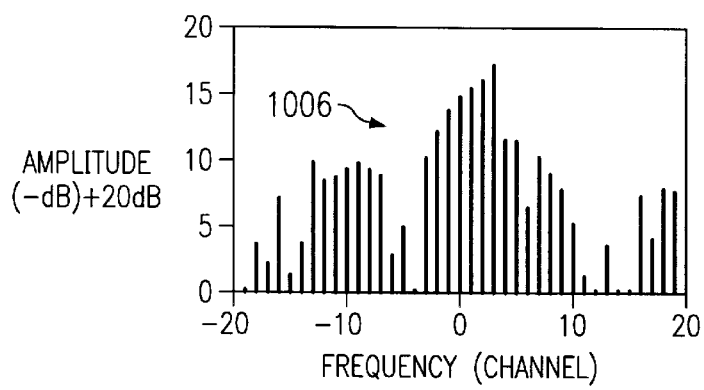
Figure 10G:
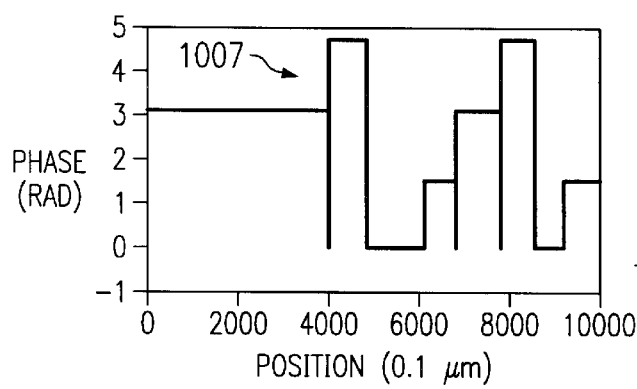
Figure 10H:
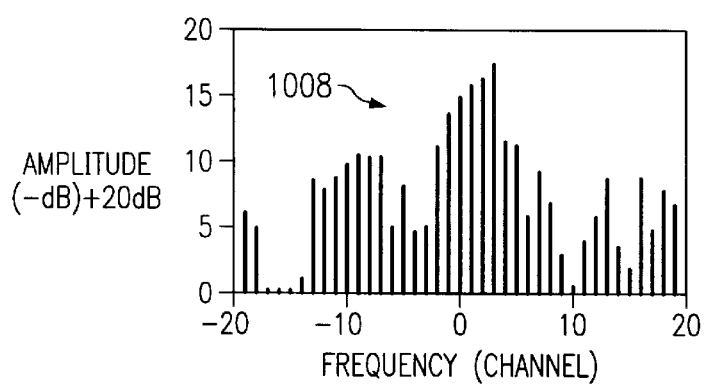

FIG. 8A shows a Dammann sampling function, as disclosed in above cited U.S. patent application Ser. No. 09/757,386, which consists of 4 phase steps of $\pi$ at specifically designed locations. This design generates 7 channels in the spectral domain, and the it shift locations are chosen to produce ideally five uniform and two outside brighter channels as shown in FIG. 8B. However, diffraction from the mask to the FBG of light transmitted through the binary phase shifts results in spectral asymmetry of the actual channel envelope that appears as lower reflectivities of the channels on the shorter wavelength side, instead of the desired equal and symmetric channel reflectivities. FIGS. 9A–9D show the experimental reflection spectra of the sampled FBGs written with phase mask-to-fiber spacing $\Delta z$ of 10, 40, 70 and 100 $\mu$m, respectively in curves 901, 902, 903, and 904, which show that the asymmetry of the channel envelope increases with spacing $\Delta z$. Other spectral structure (e.g., the grouping of bands of channels which shift as a function of $\Delta z$) shown in FIGS. 9A–9D suggests that significant sources of this behavior are diffraction effects related to the separation between the mask and the fiber.

As described above in connection with FIG. 1, the experimentally observed spectral asymmetry can be understood by the fact that the phase shift in the phase mask is split into two diffraction orders. The multi-channel FBG spectrum is given by the Fourier transform of the sampling function, S(x). The sampling function as designed is the Dammann grating that is intended to consist of a set of (four in the example of FIG. 8A) $\pi$ phase shifts (0,$\pi$) or equivalently S(x)=(1,−1) in one sampling period. The FBG phase thus alternates discretely between $\pi$ and 0 (which is equivalent to $2\pi$) as illustrated in Dammann sampling function d(x) 1101 of FIG. 11. The locations of the phase steps are optimized in such a way to have the maximum reflectivity distributed among diffracted orders of the desired intensities.

Where each π phase shift is desired in the FBG, the mask is designed with a π/2 phase shift. In other words, at this location the corrugation of the mask is shifted so that one period is enlarged by an extra ¼ of a period (¼ period=¼ (2π)=π/2 phase shift in the mask). In propagating from phase mask to the fiber core, in accordance with Equation (19), such phase shifts in the phase mask are split into two equal phase shifts, which are separated longitudinally by Δx. Then, the actual sampling function in the fiber core would contain two phase shifts of π/2 for each desired π phase shift. However, it is important to note that if a positive π/2 shift is incorporated into the mask, at each location the FBG sees two positive π/2 phase shifts separated by Δx. Thus, the sampling function in the FBG reaches a π phase level after the sum of the first pair of positive π/2 phase shifts. After the initial π phase level, the first of the next pair of positive π/2 phase shift raises the phase level to 3π/2. Only after the addition of the second part of the positive π/2 phase shift of π/2 does the phase level reach the designed value of 2π, which is equivalent to zero, as illustrated graphically in distorted sampling function S(x) 1103 of FIG. 11. This phase shift behavior continues periodically along the FBG, resulting in the asymmetrically distorted phase-only sampling function 1103 as shown in FIG. 11.

The Fourier transform of such distorted sampling functions with the additional π/2 and 3π/2 levels reveals that the channel spectrum exhibits the asymmetry, as illustrated by the computer simulation results in FIGS. 10A–10H for different phase mask-to-fiber spacing Δz, in good agreement with experimental results, for example as shown in FIGS. 9A–9D. In the simulation results of FIGS. 10A–10H, the phase of sampling function 1001 with a mask-to-fiber separation Δz=10 μm produces FBG spectrum 1002, sampling function 1003 at Δz=40 μm produces FBG spectrum 1004, sampling function 1005 at Δz=70 μm produces FBG spectrum 1006, and sampling function 1007 at Δz=100 μm produces FBG spectrum 1008.

The asymmetry reported in Williams et al., ECOC, (1997), cited above, of the reflection spectrum of a uniform FBG with a single π phase shift in the middle of the grating, when the FBG is written by a phase mask with a single π/2 phase shift at that location, can be explained by the fact disclosed in accordance with the present invention, that the phase shift is split into two π/2 shifts separated by a distance Δx, as given by Equation (14).

Figure 11:
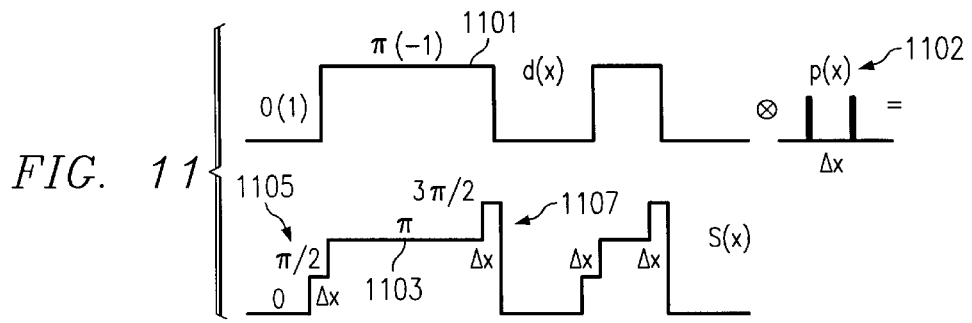
FIG. 11 is a graphic representation of the convolution operation expressed mathematically in Equation (31)

Mathematically, the distorted phase-only sampling functions shown in FIGS. 10A–10H that are written into the FBG, can be described by a convolution between the desired binary phase Dammann sampling function d(x) 1101, as illustrated in FIG. 11, which has values of only ±1 and a function p(x) 1102 representing the phase splitting, a combination of two delta functions, each having a complex constant scale value $$p(x)=(½)(1-e^{iπ/2})δ(x-Δx/2)+(½)(1+e^{iπ/2})δ(x+Δx/2). \quad (30)$$

Thus, the distorted sampling function is given by S(x)=p(x)⊗d(x) 1103 in FIG. 11. In the convolution operation, in the sections where d(x)=1 at both of the split locations (x=±Δx/2) of the δ-functions in p(x) the result is $$S(x)=p(x)⊗d(x)=(½)(1-e^{iπ/2}+1+e^{iπ/2})=1=e^{i0} \quad (31)$$

FIG. 11 is a graphic representation of the convolution process. When the first peak in right-hand side of p(x) 1102 moves across the π/2 phase shift of Dammann function d(x) 1101, its value is multiplied by -1. Then, the convolution becomes $$S(x)=p(x)⊗d(x)=(½)(-1+e^{iπ/2}+1+e^{iπ/2})=e^{iπ/2} \quad (32)$$

and the convolution remains at that value until the second peak of p(x) 1102 moves across the phase shift of d(x) 1101. When both peaks in p(x) 1102 stay in the region where d(x)=-1 the convolution value is equal to $$S(x)=p(x)⊗d(x)=(½)(-1+e^{iπ/2}-1-e^{iπ/2})=-1=e^{iπ} \quad (33)$$

Thus, the convolution of p(x) with d(x) generates an additional phase shift 1105 of amplitude π/2 and of length Δx. In the next step of the convolution, once the right peak of p(x) 1102 passes the phase shift in d(x) 1101 from π to 0 (the real value from -1 to 1), the convolution value becomes $$S(x)=p(x)⊗d(x)=(½)(1-e^{iπ/2}-1-e^{iπ/2})=-e^{iπ/2}=e^{i3π/2} \quad (34)$$

that results in a phase shift 1107 of amplitude 3π/2 and of length Δx, as represented in FIG. 11. The entire convolution function S(x) 1103 is shifted by Δx/2 relative to original Dammann sampling function d(x) 1101. This constant spatial shift, however, produces no effect on the reflection spectrum of FBG.

The Fourier transform of the deformed phase sampling function S(x) 1103 shown in FIG. 11 is $$\tilde{S}(f)=FT\{d(x)⊗p(x)\}=\tilde{D}(f)\tilde{P}(f) \quad (35)$$

where $\tilde{D}(f)$ and $\tilde{P}(f)$ are the Fourier transforms of d(x) 1101 and p(x) 1102 respectively. The Dammann spectrum $\tilde{D}(f)$ consists of multiple equally spaced peaks of symmetric intensities, as previously shown in FIG. 8B. The Fourier transform of p(x) 1102 is then a function that represents the asymmetric distorting effect of the split phases $\tilde{P}(f)$, which multiplies $\tilde{D}(f)$ to obtain the envelope of the multiple channel spectrum $\tilde{S}(f)$.

The spectral distortion function $\tilde{P}(f)$ is calculated using identities as follows.

$$(½)(1+e^{iπ/2})=e^{iπ/4}/\sqrt{2}$$

and $$(½)(1-e^{iπ/2})=e^{-iπ/4}/\sqrt{2}.$$

Hence, $$\tilde{P}(f)=(1/\sqrt{2})(e^{i(π/4-πΔx)}+e^{-i(π/4-πΔxf)})=\sqrt{2}\cos(πΔxf-π/4). \quad (36)$$

Therefore, the spectral distortion function $\tilde{P}(f)$ has width of about 1/Δx, where Δx is the longitudinal separation along the fiber core between the two split phase steps, proportional to the diffraction distance Δz from phase mask 101 to fiber core 102. The larger the spacing between the phase mask and fiber, the longer the diffraction distance, the larger separation of the phase shifts and the narrower the bandwidth of the spectral distortion envelope $\tilde{P}(f)$.

Importantly, according to Equation (36), envelope $\tilde{P}(f)$ is shifted by or π/4 relative to the center of the undistorted Dammann spectral envelope $\tilde{D}(f)$, causing asymmetry in the multi-channel spectrum, such that the larger the spacing Δz between phase mask 101 and fiber 102, the more severe the asymmetry, as shown by experimental data in FIGS. 9A–9D.

Importantly, rigorous diffraction analysis shows that a phase shift on the phase mask is not simply replicated into the FBG, but is split into two equal phase shifts by the diffracted beam propagation. This observation explains the asymmetry of the Dammann sampling multiple channel spectral envelope, in agreement with experiment. This fundamental understanding of the FBG side-writing process can be applied to design of any phase mask which contains phase shifts.

Figure 12A:
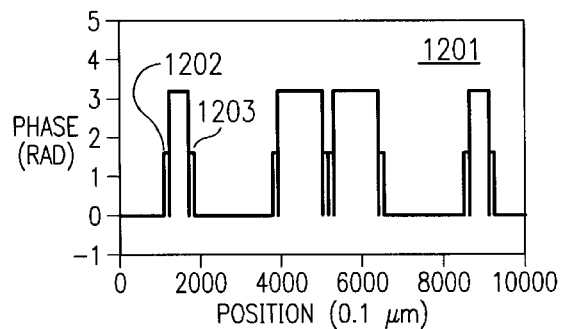
FIGS. 12A–12B represent graphically a design of a phase-only Dammann sampling function according to an embodiment of the present invention, which generates a nine-channel spectral envelope without roll off asymmetry in the FBG.

According to embodiments of the present invention, a new phase mask, which generates multi-channel FBGs substantially free of asymmetry, is designed using a phase-only Dammann sampling function. Since a positive π/2 phase shift in the phase mask is split into two positive or π/2 phase shifts separated in the FBG by Δx, and because the total phase of the FBG index modulation is determined by the accumulation of these phase shifts, the desired Dammann sampling function, for example as shown in FIG. 8A, is distorted as shown in FIG. 11. As a result, the consecutive phase shifts of positive π/2 introduce asymmetry in the reflection spectral envelope of the multiple channel FBG. To eliminate this asymmetry, the Dammann sampling function design is changed from the set of all positive π/2 phase shifts to a set of alternating positive π/2 and negative π/2 shifts. Ideally (if Δx=0) this does not alter the Dammann sampling function profile, but when Δx # 0 this changes the cumulative phase levels in the FBG from the asymmetric sequence [0, π/2, π, 3π/2, 2π] to the symmetric sequence [0, π/2, π, π/2, 0], where the first two phase levels are introduced by the +π/2 phase shift in phase mask 101 and the two last phase levels are introduced by the −π/2 phase shift in phase mask 101, as depicted in FIG. 12A. The alternation of phase shifts breaks the asymmetric phase structure in the FBG and thereby removes the associated asymmetry in the FBG spectrum.

Figure 12B:
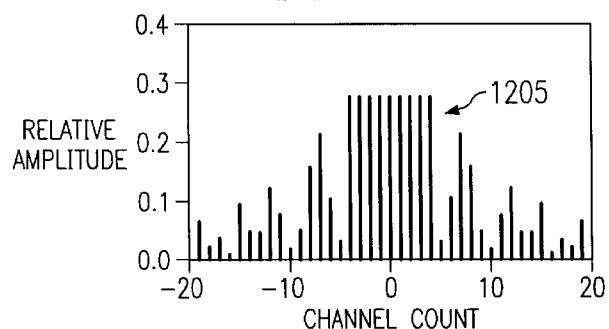

A simulated thermal annealing nonlinear optimization procedure similar to that described in connection with FIGS. 6A and 6B is used to determine the positions of the phase shifts, taking into account the splitting of the shifts from diffraction effects. FIGS. 12A–12B represent graphically a design of phase-only Dammann sampling function 1201 according to embodiments of the present invention, which generates a nine-channel spectral envelope 1205 without asymmetry in the FBG. Sampling function 1201 contains symmetric π/2 phase shifts of width Δx, for example phase shifts which are associated with the fact that the ±π/2 phase shifts in the phase mask are split into two equal phase shifts in the FBG spaced by Δx.

Figure 12C:
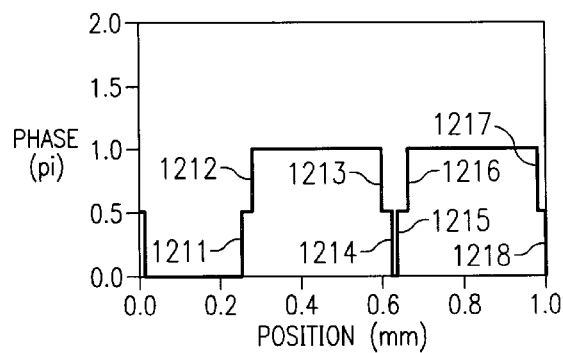
FIGS. 12C–12E represent phase shifts of the FBG sampling function, a resulting multiple channel spectral amplitude envelope, and an experimental result of an FBG for a 5 channel design made according to the alternating sign phase-shift embodiment of the present invention.
Figure 12D:
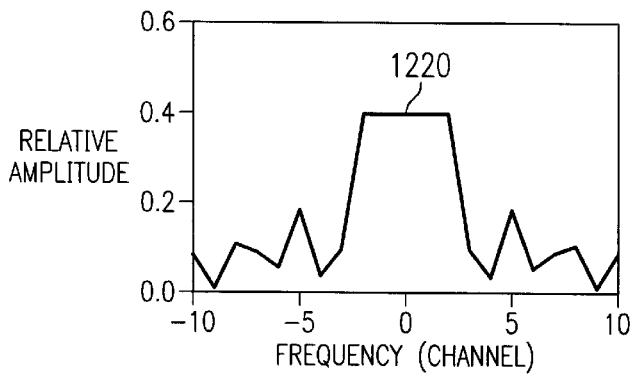
Figure 12E:
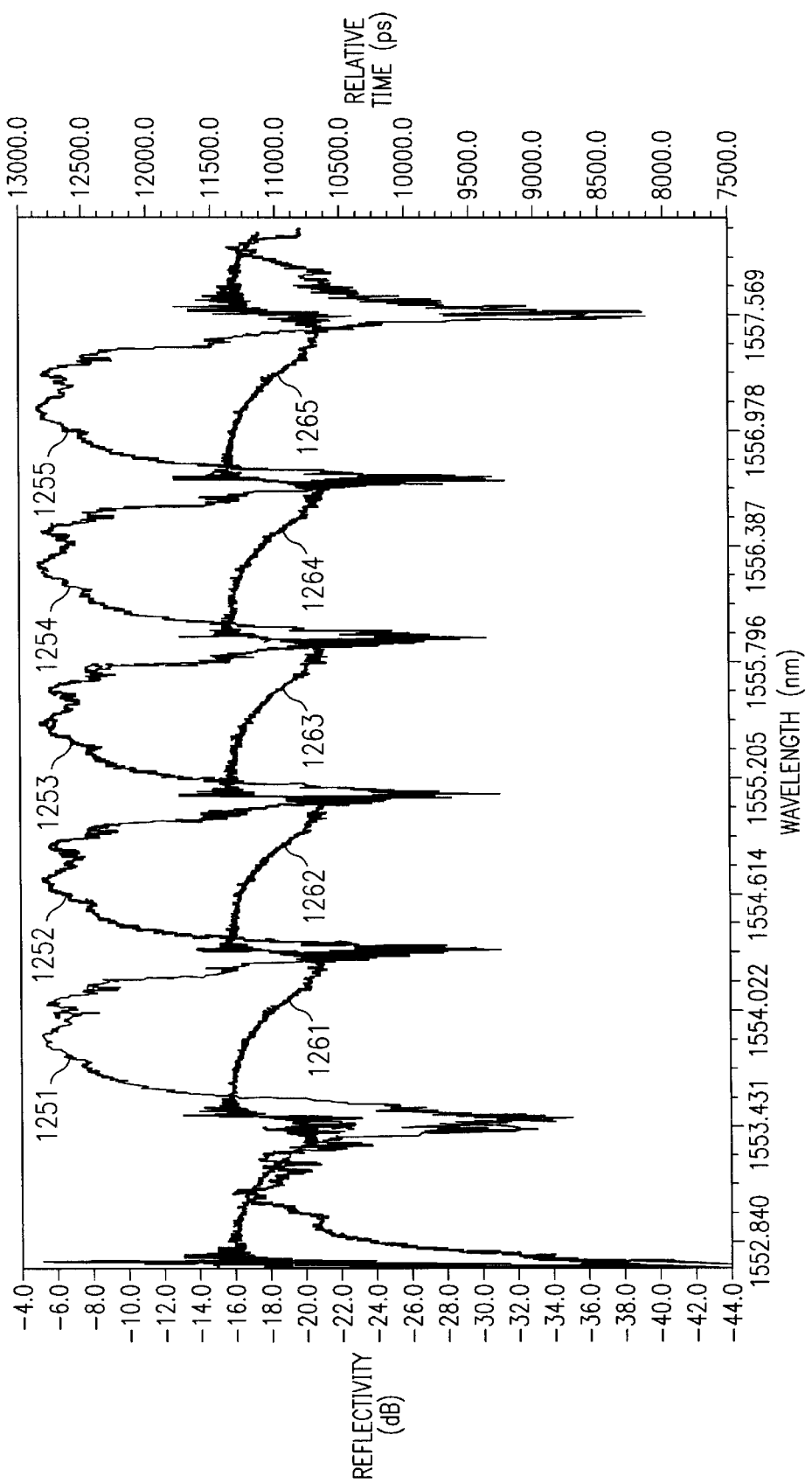

FIGS. 12C and 12D represent phase shifts 1211–1218 of the FBG sampling function in phase versus position and resulting multiple channel spectral amplitude envelope 1220 in arbitrary units for a 5 channel design using the alternating sign phase-shift embodiment. FIG. 12E displays an experimental result of an FBG made with this mask design. The spectrum shows five adjacent channels 1251–1255 of substantially equal measured reflectivity on a vertical reflectivity scale along the left-hand side of the diagram. The spectral asymmetry has been eliminated, and the 5 channels all have equal reflectivity. In FIG. 12E is also shown the measured group delay 1261–1265 in psec along the right-hand vertical scale for the respective five adjacent channels. Group delay, which determines FBG dispersive properties, is also substantially identical in the five channels, but is less sensitive than reflectivity to spectral asymmetry.

Referring again to FIG. 1, numerical analysis shows that the phase shift on the phase mask introduces two equal phase shifts, which are separated longitudinally by a distance Δx proportional to spacing Δz between phase mask 101 and fiber core 102, as described by Equation (14). The actual optical field can be modeled as the Dammann sampling function being convolved by a distortion kernel. As a result, the Dammann multiple channels in the FBG reflection spectrum are modulated by a cosine envelope, as described in Equation (36), which is shifted by or π/4 phase from the center of the spectrum, resulting in the observed spectral asymmetry.

Figure 13:
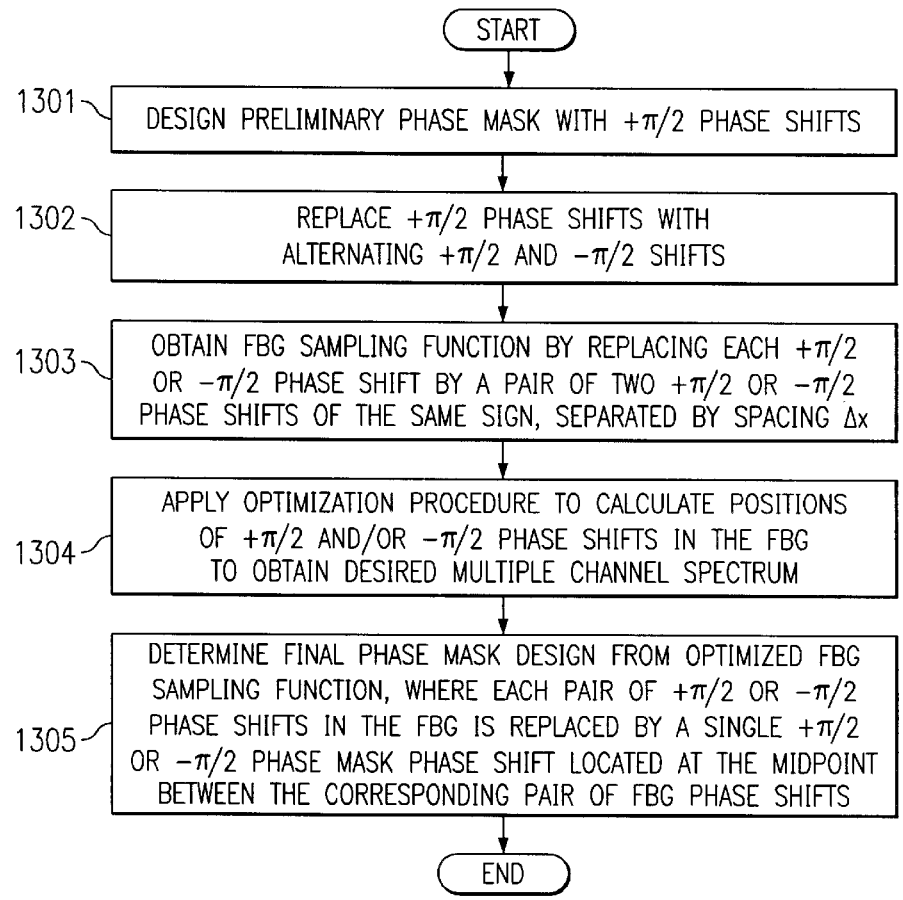
FIG. 13 is a flow diagram depicting a solution to the roll off asymmetry problem, in accordance with embodiments of the present invention, in which sampling functions are designed taking into account the propagation diffraction effect.

By this analysis the asymmetry is inherent to FBGs made using the contact side-writing method and a phase mask with discrete phase shifts. FIG. 13 is a flow diagram depicting a mask design solution to the asymmetry problem, in accordance with embodiments of the present invention, in which sampling functions are designed taking into account the propagation and diffraction effects. In the design, a preliminary phase mask with discrete π/2 phase shifts, for example a Dammann grating sampling function, is generated at step 1301. Then at step 1302, the π/2 phase shifts are replaced with alternating +π/2 and −π/2 phase shift pairs. At step 1303, each π/2 phase shift on the phase mask is replaced by a pair of two π/2 phase shifts in the FBG, which are separated by predetermined distance Δx according to effective phase mask-fiber core spacing Δz and Equation (14). Thus the sequence {+π/2, −π/2}, is replaced by the sequence {(+π/2,+π/2), (−π/2, −π/2)}.

At step 1304, the positions of these ±π/2 phase shifts are optionally adjusted by an optimization procedure, for example by a simulated annealing (Dammann optimization) or other nonlinear optimization procedure as described above in connection with FIGS. 6A and 6B, and the location of each phase shift pair then determines the optimized position of the generating single phase shift on the masks, according to the spatial separation ±Δx/2 and Equation (14). That is, each pair of ±π/2 phase shifts in the FBG is generated by a single ±π/2 phase shift in the mask located longitudinally half-way between the two FBG shifts, which are separated by the distance Δx. Thus, in step 1305 the optimized FBG design will determine the position of the phase shifts on the mask, such that upon contact side writing of the FBG at the specified effective separation from the mask to the fiber core Δz, the split phase shifts will be located optimally at ±Δx/2 in the FBG relative to the longitudinal position of the corresponding mask phase shift, and the desired multiple channel reflection spectrum envelope will be obtained. That is, each pair of ±π/2 phase shifts in the FBG is replaced by a single ±π/2 phase shift in the mask located at the midpoint longitudinally between the corresponding pair of phase shifts in the FBG. Note that the above approach also enables designing and fabricating more sophisticated FBGs with arbitrary phase shifts, and continuous phase shifted FBGs, which may be approximated by a large number of small, discrete phase shifts.

In an alternative to embodiments of the present invention, an imaging system can project the near field into fiber core, substantially reducing the phase shift separation Δx near zero, thus widening the bandwidth of the envelope function and, thereby reducing any asymmetry. In this approach an uncompensated phase mask can be used. However, the approach is critically dependent on the fiber alignment and additionally introduces uncertainties relating to how precisely and stably phase shifts of the order of 0.25 μm can be imaged by existing imaging systems.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of designing a pre-compensated phase mask for side-writing a fiber Bragg grating (FBG) on an optical fiber core, said method comprising the steps of:
    determining an effective spacing between said phase mask and said optical fiber core for said side-writing; and
    calculating a phase mask design, such that a desired FBG phase function is written on said fiber core by a pattern of light diffracting from said designed phase mask through said effective spacing, said designed phase mask being pre-compensated to offset diffraction effects associated with each longitudinal position on said FBG receiving light from two corresponding longitudinal positions on said phase mask, said two corresponding longitudinal positions on said phase mask being substantially symmetrically spaced longitudinally relative to each said longitudinal position on said FBG.

2. The method of claim 1 wherein said two corresponding longitudinal positions on said phase mask are spaced longitudinally relative to each said longitudinal position on said FBG at a longitudinal shift determined by said effective spacing and a first order diffraction angle of light from said phase mask.

3. The method of claim 1 wherein said desired FBG phase function produces a multi-channel reflectance spectra having an arbitrarily selectable set of channel amplitudes.

4. The method of claim 3 wherein said multi-channel reflectance spectra contains a selectable plurality of channels having substantially uniform reflectance amplitudes.

5. The method of claim 3 wherein said multi-channel reflectance spectra contains a selectable plurality of channels having substantially zero reflectance amplitudes.

6. The method of claim 1, further comprising the step of generating said desired FBG phase function.

7. The method of claim 1 wherein the phase at said each longitudinal position on said FBG is substantially the sum of phases at said two corresponding longitudinal positions on said phase mask being substantially symmetrically spaced longitudinally relative to each said longitudinal position on said FBG.

8. The method of claim 6 wherein said step of calculating further comprises the steps of:
    performing a Fourier transform of said desired FBG phase function, said Fourier transform having spatial frequency components;
    multiplying each said spatial frequency component of said Fourier transform by a predetermined transfer function to obtain a phase mask phase function spectrum for said pre-compensated phase mask; and
    performing an inverse Fourier transform of said phase mask phase function spectrum to obtain said designed pre-compensated phase mask phase function.

9. The method of claim 8 wherein said step of multiplying by said predetermined transfer function increases high spatial frequency components of said Fourier transform relative to low spatial frequency components of said Fourier transform.

10. The method of claim 9 wherein said predetermined transfer function has an inverse cosine spatial frequency dependence.

11. The method of claim 10 wherein said spatial frequency components are limited to frequencies appreciably below those at which said predetermined transfer function has a singularity.

12. The method of claim 10 wherein said spatial frequency components include frequencies appreciably above and below those at which said predetermined transfer function has a singularity and are limited to exclude only frequencies closely adjacent those frequencies at which said predetermined transfer function has a singularity.

13. The method of claim 6 wherein said desired FBG phase function is generated in the form of a truncated Fourier series expansion having a preselected number of terms and representing a preselected number of spatial frequency components.

14. The method of claim 13 wherein each said term of said truncated Fourier series expansion contains at least one free parameter.

15. The method of claim 14 wherein each said term of said truncated Fourier series expansion contains two free parameters.

16. The method of claim 14 further comprising the steps of:
    applying an optimization algorithm to said truncated Fourier series expansion to evaluate said at least one free parameter, such that said truncated Fourier series expansion is optimized;
    evaluating said truncated Fourier series expansion for the value of said at least one free parameter that results from applying said optimization algorithm; and
    multiplying each term of said evaluated truncated Fourier series expansion by a predetermined transfer function to obtain an optimized phase function for said pre-compensated phase mask.

17. The method of claim 16 wherein said step of multiplying by said predetermined transfer function increases high spatial frequency components of said truncated Fourier series expansion relative to low spatial frequency components of said truncated Fourier series expansion.

18. The method of claim 17 wherein said predetermined transfer function has an inverse cosine spatial frequency dependence.

19. The method of claim 16 further comprising the step of varying said preselected number of terms of said truncated Fourier series expansion.

20. The method of claim 16 wherein said optimization algorithm is a nonlinear optimization procedure.

21. The method of claim 20 wherein said nonlinear optimization procedure is selected from the group consisting of simulated thermal annealing nonlinear optimization procedures, simplex method, Powell's method, conjugate gradient method, variable metric method, linear programming methods, and Dammann optimization procedures.

22. The method of claim 1 further comprising the steps of:
    generating an initial mask phase function in the form of a truncated Fourier series expansion having a preselected number of terms containing at least one free parameter and representing at least one spatial frequency component;

calculating an initial FBG index variation from the intensity of said pattern of light diffracted from said designed phase mask;

performing a transform of said FBG index variation to obtain an initial spectral reflectivity envelope; and applying an optimization algorithm to said transformed FBG index variation to evaluate said at least one free parameter, such that said FBG spectral reflectivity envelope is optimized.

23. The method of claim 22 wherein said step of calculating is performed using a procedure selected from the group consisting of angular plane wave spectrum, scalar diffraction, and finite difference in time domain vector diffraction.

24. The method of claim 22 wherein said step of performing a transform is performed using a procedure selected from the group consisting of Fourier transforms and transfer matrices.

25. The method of claim 22 wherein said optimization algorithm is a nonlinear optimization procedure.

26. The method of claim 25 wherein said nonlinear optimization procedure is selected from the group consisting of simulated thermal annealing nonlinear optimization procedures, simplex method, Powell's method, conjugate gradient method, variable metric method, linear programming methods, and Dammann optimization procedures.

27. The method of claim 2 wherein said step of calculating further comprises the step of generating said desired FBG phase function, wherein a preliminary phase mask design includes at least one discontinuous $\pi/2$ phase shift.

28. The method of claim 27 wherein said step of calculating further comprises:

replacing each of said at least one discontinuous $\pi/2$ phase shift in said phase mask design with a pair of $\pi/2$ phase shifts in said FBG design, said pair of $\pi/2$ phase shifts having a longitudinal separation equal to said longitudinal shift;

replacing consecutive $+\pi/2$ phase shift pairs in said FBG design with alternating $+\pi/2$ and $-\pi/2$ phase shift pairs in said FBG design; and generating a channel spectrum of said desired FBG phase function incorporating said replacement phase shift pairs.

29. The method of claim 28 further comprising the step of applying an optimization algorithm to said channel spectrum to determine the optimum longitudinal positioning of said replacement phase shift pairs, such that said longitudinal separation between said phase shifts within a pair is maintained and such that said channel spectrum is optimized.

30. The method of claim 29 further comprising the step of calculating said designed mask phase function from the location of said $\pm\pi/2$ phase shift pairs of said optimized FBG phase function, such that each said $\pm\pi/2$ FBG phase shift pair having said longitudinal separation is incorporated in said designed mask phase function as a single $\pm\pi/2$ phase shift, said single $\pm\pi/2$ phase shift being located symmetrically half-way between said paired $\pm\pi/2$ FBG phase shifts.

31. The method of claim 30 wherein said optimization algorithm is a nonlinear optimization procedure.

32. The method of claim 31 wherein said nonlinear optimization procedure is selected from the group consisting of simulated thermal annealing nonlinear optimization procedures, simplex method, Powell's method, conjugate gradient method, variable metric method, linear programming methods, and Dammann optimization procedures.

33. A phase mask operable to side-write a fiber Bragg grating (FBG) on an optical fiber core by a pattern of light diffracting from said phase mask through an effective spacing to said fiber core, said phase mask being pre-compensated to offset diffraction effects associated with each longitudinal position of said FBG receiving said light in said pattern from two corresponding positions of said phase mask, said two corresponding longitudinal positions of said phase mask being substantially symmetrically spaced longitudinally relative to each said longitudinal position of said FBG, wherein said FBG is operable to generate a channel spectrum.

34. The phase mask of claim 33 wherein said pre-compensation includes increasing high spatial frequency components relative to low spatial frequency components in the phase function of said phase mask using a predetermined transfer function.

35. The phase mask of claim 34 wherein said predetermined transfer function has an inverse cosine spatial frequency dependence.

36. The phase mask of claim 35 wherein said spatial frequency components in said predetermined transfer function are limited to frequencies appreciably below those at which said predetermined transfer function has a singularity.

37. The phase mask of claim 35 wherein said spatial frequency components in said predetermined transfer function include frequencies appreciably above and below those at which said predetermined transfer function has a singularity and are limited to exclude only frequencies closely adjacent those frequencies at which said predetermined transfer function has a singularity.

38. The phase mask of claim 33 wherein said two corresponding longitudinal positions of said phase mask are spaced longitudinally relative to each said longitudinal position of said FBG with a longitudinal spacing determined by said effective spacing and by a first order diffraction angle of light through said phase mask.

39. The phase mask of claim 38 wherein a preliminary design of said phase mask comprises at least one discontinuous $\pi/2$ phase shift.

40. The phase mask of claim 39 wherein said at least one discontinuous $\pi/2$ phase shift in said preliminary phase mask design is replaced in said FBG with a $\pi/2$ phase shift pair, each said $\pi/2$ phase shift pair maintaining a longitudinal separation equal to said longitudinal shift, and wherein consecutive $+\pi/2$ phase shift pairs are replaced with alternating $+\pi/2$ and $-\pi/2$ phase shift pairs.

41. The phase mask of claim 40 wherein the longitudinal positioning of said replacement phase shifts is optimized, such that said channel spectrum is optimized.

42. The phase mask of claim 41 wherein each of said optimized $\pm\pi/2$ FBG phase shift pairs separated by said longitudinal shift is incorporated in said phase mask phase function as a single $\pm\pi/2$ phase shift, said $\pi/2$ phase shift in said phase mask located symmetrically half-way between said pair of said $\pm\pi/2$ FBG phase shifts.

43. The phase mask of claim 33 further operable to generate a multi-channel FBG reflectance spectra.

44. A method of side-writing a fiber Bragg grating (FBG) on an optical fiber core, said method comprising the steps of:

positioning a phase mask substantially parallel to and at an effective spacing relative to said optical fiber core; and diffracting light from said phase mask through said effective spacing to said optical fiber core to create a desired FBG phase function, such that each longitudinal position of said fiber core receives light from two corresponding longitudinal positions of said phase mask, said two corresponding positions of said phase mask being substantially symmetrically spaced longitudinally relative to each said longitudinal position of said fiber core, said phase mask being pre-compensated to offset diffraction effects associated with each longitudinal position of said FBG receiving said light in said pattern from two corresponding longitudinal positions of said phase mask, said two corresponding longitudinal positions of said phase mask being substantially symmetrically spaced longitudinally relative to each said longitudinal position of said fiber core.

45. The method of claim 44 wherein said two corresponding longitudinal positions of said phase mask are spaced longitudinally relative to each said longitudinal position of said FBG with a longitudinal shift determined by said effective spacing and a first order diffraction angle of light from said phase mask.

46. The method of claim 44 wherein said desired FBG phase function produces a multi-channel reflectance spectra having an arbitrarily selectable set of channel amplitudes.

47. The method of claim 46 wherein said multi-channel reflectance spectra contains a selectable plurality of channels having substantially uniform reflectance amplitudes.

48. The method of claim 46 wherein said multi-channel reflectance spectra contains a selectable plurality of channels having substantially zero reflectance amplitudes.

49. The method of claim 44 wherein the phase at said each longitudinal position on said FBG is substantially the sum of phases at said two corresponding longitudinal positions on said phase mask being substantially symmetrically spaced longitudinally relative to each said longitudinal position on said FBG.

50. The method of claim 44 wherein said pre-compensating of said phase mask comprises the steps of:
performing a Fourier transform of said desired FBG phase function;
multiplying each spatial frequency component of said Fourier transform by a predetermined transfer function to obtain a spectrum of phase mask phase function for said pre-compensated phase mask; and
performing an inverse Fourier transform of said phase mask phase function spectrum to obtain said pre-compensated phase mask phase function design.

51. The method of claim 50 wherein said step of multiplying by said predetermined transfer function increases high spatial frequency components of said Fourier transform relative to low spatial frequency components of said Fourier transform.

52. The method of claim 51 wherein said predetermined transfer function has an inverse cosine spatial frequency dependence.

53. The method of claim 52 wherein said spatial frequency components are limited to frequencies appreciably below those at which said predetermined transfer function has a singularity.

54. The method of claim 52 wherein said spatial frequency components include frequencies appreciably above and below those at which said predetermined transfer function has a singularity and are limited to exclude only frequencies closely adjacent those frequencies at which said predetermined transfer function has a singularity.

55. The method of claim 44 wherein said desired phase function is generated in the form of a truncated Fourier series expansion having a preselected number of terms.

56. The method of claim 55 wherein each term of said truncated Fourier series expansion contains at least one free parameter.

57. The method of claim 56 wherein each said term of said truncated Fourier series expansion contains two free parameters.

58. The method of claim 56 further comprising the steps of:
performing a Fourier transform of said truncated Fourier series expansion to generate a channel spectrum, said channel spectrum containing a plurality of free parameters;
applying an optimization algorithm to said channel spectrum to evaluate said plurality of free parameters, such that said channel spectrum is optimized;
evaluating said truncated Fourier series expansion for values of said plurality of free parameters that result from applying said optimization algorithm; and
multiplying each term of said evaluated Fourier series expansion by a predetermined transfer function to obtain an optimized phase function for said pre-compensated phase mask.

59. The method of claim 58 wherein said step of multiplying by said predetermined transfer function increases high spatial frequency components of said truncated Fourier series expansion relative to low spatial frequency components of said evaluated Fourier series expansion.

60. The method of claim 59 wherein said predetermined transfer function has an inverse cosine spatial frequency dependence.

61. The method of claim 58 further comprising the step of varying said preselected number of terms of said truncated Fourier series expansion.

62. The method of claim 58 wherein said optimization algorithm is a nonlinear optimization procedure.

63. The method of claim 62 wherein said nonlinear optimization procedure is selected from the group consisting of simulated thermal annealing nonlinear optimization procedures, simplex method, Powell's method, conjugate gradient method, variable metric method, linear programming methods, and Dammann optimization procedures.

64. The method of claim 45 wherein said desired FBG phase function is calculated from a preliminary phase mask design that includes at least one discontinuous $\pi/2$ phase shift.

65. The method of claim 64 further comprising the steps of:
replacing each of said at least one discontinuous $\pi/2$ phase shift in said preliminary phase mask design with two $\pi/2$ phase shifts in said FBG design, with said two $\pi/2$ phase shifts having a longitudinal separation equal to said longitudinal shift;
replacing consecutive $+\pi/2$ phase shift pairs in said FBG design with alternating $+\pi/2$ and $-\pi/2$ phase shift pairs in said FBG design;
generating a channel spectrum of said desired FBG phase function incorporating said replacement phase shift pairs; and
applying an optimization algorithm to said channel spectrum to determine the longitudinal positioning of said replacement phase shift pairs, such that said longitudinal separation between said phase shifts within said phase shift pair is maintained and such that said channel spectrum is optimized.

66. The method of claim 65 further comprising the step of calculating said designed mask phase function from the location of said $\pm\pi/2$ phase shift pairs of said optimized FBG phase function, such that each said $\pm\pi/2$ FBG phase shift pair having said longitudinal separation between said phase shifts within said pair is incorporated in said designed mask phase function as a single $\pm\pi/2$ phase shift, said single $\pm\pi/2$ phase shift being located symmetrically half-way between said paired $\pm\pi/2$ FBG phase shifts.

67. The method of claim 65 wherein said optimization algorithm is a nonlinear optimization procedure.

68. The method of claim 67 wherein said nonlinear optimization procedure is selected from the group consisting of simulated thermal annealing nonlinear optimization procedures, simplex method, Powell's method, conjugate gradient method, variable metric method, linear programming methods, and Dammann optimization procedures.

69. The method of claim 44 wherein said pre-compensating of said phase mask comprises the steps of:

generating an initial mask phase function in the form of a truncated Fourier series expansion having a preselected number of terms containing at least one free parameter and representing at least one spatial frequency component;

calculating an initial FBG index variation from the diffracted intensity of said phase mask;

performing a transform of said FBG index variation to obtain a spectral reflectivity envelope; and applying an optimization algorithm to said transformed FBG index variation to evaluate said at least one free parameter, such that said FBG spectral reflectivity envelope is optimized.

70. The method of claim 69 wherein said step of calculating is performed using a procedure selected from the group consisting of angular plane wave spectrum, scalar diffraction, and finite difference in time domain vector diffraction.

71. The method of claim 69 wherein said step of performing a transform is performed using a procedure selected from the group consisting of Fourier transforms and transfer matrices.

72. The method of claim 69 wherein said optimization algorithm is a nonlinear optimization procedure.

73. The method of claim 72 wherein said nonlinear optimization procedure is selected from the group consisting of simulated thermal annealing nonlinear optimization procedures, simplex method, Powell's method, conjugate gradient method, variable metric method, linear programming methods, and Dammann optimization procedures.

* * * * *